US012173904B2

(12) United States Patent
Ham et al.

(10) Patent No.: US 12,173,904 B2
(45) Date of Patent: Dec. 24, 2024

(54) OVEN

(71) Applicant: SAMSUNG ELECTRONICS CO., LTD., Suwon-si (KR)

(72) Inventors: Hyung Kwen Ham, Suwon-si (KR); Hyeon Kyu Lim, Suwon-si (KR); Nam Soo Park, Suwon-si (KR); Wan Gi Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1002 days.

(21) Appl. No.: 17/261,264

(22) PCT Filed: May 23, 2019

(86) PCT No.: PCT/KR2019/006171
§ 371 (c)(1),
(2) Date: Jan. 19, 2021

(87) PCT Pub. No.: WO2020/017751
PCT Pub. Date: Jan. 23, 2020

(65) Prior Publication Data

US 2021/0278090 A1 Sep. 9, 2021

(30) Foreign Application Priority Data

Jul. 20, 2018 (KR) ........................ 10-2018-0085002

(51) Int. Cl.
*F24C 15/02* (2006.01)
*E05B 47/00* (2006.01)
*E05B 65/00* (2006.01)

(52) U.S. Cl.
CPC ........ *F24C 15/022* (2013.01); *E05B 47/0002* (2013.01); *E05B 65/00* (2013.01);
(Continued)

(58) Field of Classification Search
CPC .................. Y10T 292/0947; E05B 2047/0013
See application file for complete search history.

(56) References Cited

U.S. PATENT DOCUMENTS 4,088,354 A * 5/1978 Kolendowicz ........ F24C 15/022 292/216
4,917,022 A * 4/1990 Ogasawara ......... E05B 47/0012 109/43
(Continued)

FOREIGN PATENT DOCUMENTS

CN 107339021 A * 11/2017
EP 1433893 A2 * 6/2004 ............. D06F 37/42
(Continued)

OTHER PUBLICATIONS

International Search Report dated Sep. 20, 2019 from International Application No. PCT/KR2019/006171, 5 pages.
(Continued)

*Primary Examiner* — Jorge A Pereiro
(74) *Attorney, Agent, or Firm* — STAAS & HALSEY LLP

(57) ABSTRACT

The present disclosure relates to an oven including a main body including a cooking chamber, a door rotatably coupled to the main body to open and close the cooking chamber, and a door locking device to lock the door not to be open with respect to the main body, wherein the door locking device includes a cam to be rotatable and including a plurality of first contact parts and a plurality of second contact parts, a lock releasing guide to linearly move to selectively come into contact with the plurality of first contact parts, and a locker to come into contact with the plurality of second contact parts and coupled to a locker holder provided in the door when coming into the plurality of second contact parts. Other various embodiments are possible.

7 Claims, 29 Drawing Sheets

(52) U.S. Cl.
CPC ... *E05B 47/0012* (2013.01); *E05B 2047/0021* (2013.01); *E05B 2047/0036* (2013.01); *E05Y 2201/22* (2013.01); *Y10S 292/69* (2013.01)

(56) References Cited

U.S. PATENT DOCUMENTS 5,004,276 A 4/1991 Hanley
5,493,099 A * 2/1996 McWilliams, III ....... E05C 3/30 292/124
5,862,692 A * 1/1999 Legault .............. G07C 9/00912 70/333 R
6,185,773 B1 * 2/2001 Goedde .................... G07C 9/28 340/5.1
6,318,134 B1 * 11/2001 Mossberg ........... E05B 65/5292 292/144
6,374,649 B1 * 4/2002 Holcomb ........... G07C 9/00182 312/215
6,377,005 B1 * 4/2002 Zintler .................... E05B 81/64 318/653
11,761,640 B2 * 9/2023 Chirumbolo ............. F23M 7/00 126/198
2003/0127866 A1 * 7/2003 Martinez ............. E05B 17/0029 292/216
2005/0173932 A1 * 8/2005 Lomicka ............... F24C 15/022 292/201
2005/0262770 A1 * 12/2005 Warriner ............... E05C 19/002 49/402
2006/0001273 A1 * 1/2006 Smith ................... F24C 15/022 292/204
2006/0001274 A1 * 1/2006 Smith ................... F24C 15/022 292/204
2006/0131893 A1 * 6/2006 Tomaszewski ......... E05B 81/25 292/216
2006/0232077 A1 * 10/2006 Courter ................. F24C 15/022 292/201
2007/0144880 A1 6/2007 Bragg et al.
2007/0241568 A1 * 10/2007 Harrer .................. H05B 6/6417 292/144
2007/0262590 A1 * 11/2007 Courter ................. F24C 15/022 292/201
2007/0296224 A1 * 12/2007 Courter ................... E05C 19/10 292/109
2008/0196707 A1 * 8/2008 Chirumbolo .......... F24C 15/022 292/199
2008/0305938 A1 * 12/2008 Hayasaka ............. E05B 47/023 494/12
2010/0223968 A1 * 9/2010 Krueger .................. E05B 81/06 70/283.1
2011/0181053 A1 * 7/2011 Marschner ................ F16P 3/08 292/195
2014/0001930 A1 * 1/2014 Slogoff ................. E05B 47/023 312/215
2014/0246964 A1 * 9/2014 Boyd .................. E05B 47/0012 312/209
2018/0087778 A1 * 3/2018 Ivanovic ............... E05B 47/023
2018/0355643 A1 * 12/2018 Taurasi ................... E05B 81/16
2019/0013714 A1 * 1/2019 DeYoung ................ F24F 13/10
2019/0071895 A1 * 3/2019 Raz ..................... E05B 65/1046

FOREIGN PATENT DOCUMENTS

KR 10-2009-0103293 10/2009
KR 10-1409957 6/2014
WO 2014/015182 1/2014

OTHER PUBLICATIONS

Korean Office Action dated Sep. 12, 2022 for Korean Application No. 10-2018-0085002.
Korean Office Action dated Mar. 25, 2023 for Korean Application No. 10-2018-0085002.
Korean Office Action dated Jun. 2, 2023 for Korean Application No. 10-2018-0085002.

* cited by examiner

OVEN

CROSS-REFERENCE TO RELATED APPLICATIONS

This application is a U.S. National Stage Application which claims the benefit under 35 U.S.C. § 371 of International Patent Application No. PCT/KR2019/006171 filed on May 23, 2019, which claims foreign priority benefit under 35 U.S.C. § 119 of Korean Patent Application No. 10-2018-0085002 filed on Jul. 20, 2018 in the Korean Intellectual Property Office, the contents of each of which are incorporated herein by reference.

TECHNICAL FIELD

The present disclosure relates to an oven having a door locking device to lock or unlock a door.

BACKGROUND ART

An oven, which is an apparatus for sealing, heating, and cooking an object to be cooked, may be generally classified into an electric-type oven, a gas-type oven, and a microwave range depending on a heat source.

The electric-type oven uses an electric heater as a heat source, and the gas-type oven and the microwave range use heat generated by gas and friction heat of water molecules caused by a high frequency as heat sources, respectively.

The oven may include a main body forming an outer appearance, a cooking chamber formed inside the main body to have an open front, and a door rotatably coupled to the main body to open and close the cooking chamber.

A plurality of shelves on which food to be cooked is placed is provided in the cooking chamber, and the plurality of shelves is supported by oven racks.

When a temperature in the cooking chamber reaches a set temperature or higher, the oven may fix the door so that the door does not open. In this case, because the door may not be open when power is cut off or the oven fails, a user may feel uncomfortable.

DISCLOSURE

Technical Problem

The present disclosure is directed to providing an oven having a door locking device including an unlocking guide for releasing a locker that fixes a door even in a state in which the door is not open.

The present disclosure is directed to providing an oven having a door locking device capable of releasing a door lock state by moving a locker that fixes a door.

Technical Solution

One aspect of the present disclosure provides an oven including a main body including a cooking chamber, a door rotatably coupled to the main body to open and close the cooking chamber, and a door locking device configured to lock the door not to be open with respect to the main body, wherein the door locking device includes a cam configured to be rotatable and including a plurality of first contact parts and a plurality of second contact parts, a lock releasing guide configured to linearly move to selectively come into contact with the plurality of first contact parts, and a locker configured to come into contact with the plurality of second contact parts and coupled to a locker holder provided in the door when coming into the plurality of second contact parts.

When the lock releasing guide moves to come into contact with the plurality of first contact parts, a contact between the locker and the plurality of second contact parts may be released so that the locker is separated from the locker holder.

The locker may include one end coming into contact with the plurality of second contact parts, the other end coupled to the locker holder, and a hole disposed between the one end and the other end and rotatably fitted into a shaft provided in the door locking device.

When a contact between the lock releasing guide and the plurality of first contact parts is released and the one end of the locker comes into contact with the plurality of second contact parts, the locker may rotate about the shaft so that the other end of the locker is coupled to the locker holder.

The door locking device may include a rocker elastic body fitted into the shaft, and when the contact between the lock releasing guide and the plurality of first contact parts is released and the one end of the locker is separated from the plurality of second contact parts, the locker may be rotated by an elastic force of the locker elastic body so that the other end of the locker is separated from the locker holder.

When the locker rotates about the shaft, the other end of the locker may be separated from the locker holder.

At least one of the plurality of second contact parts and the one end of the locker coming into contact with the plurality of second contact parts may include an inclined surface.

Another aspect of the present disclosure provides an oven including a main body including a cooking chamber, a door rotatably coupled to the main body to open and close the cooking chamber, and a door locking device configured to lock the door not to be open with respect to the main body, wherein the door locking device includes a lock releasing cam including a first end and a second end, a lock releasing guide configured to move in a first linear direction in response to the movement of the first end rotatably fastened to a follower coming into contact with the cam when the cam rotates in a first rotation direction, and a locker configured to be coupled to a locker holder provided in the door in response to the movement of the second end rotatably fastened to the follower coming into contact with the cam when the cam rotates in the first rotation direction.

When the lock releasing guide moves in a second linear direction, the lock releasing cam may rotate in a second rotation direction, and the locker may be separated from the locker holder in response to the rotation of the lock releasing cam.

The locker may include one end coming into contact with the second end of the lock releasing cam, the other end coupled to the locker holder, and a hole disposed between the one end and the other end and rotatably fitted into a shaft provided in the door locking device.

When the lock releasing cam rotates in the first rotation direction, the locker may rotate in a third rotation direction about the shaft so that the other end of the locker is coupled to the locker holder.

The door locking device may include a locker elastic body fitted into the shaft, and when the lock releasing cam rotates in the second rotation direction, the locker may be rotated in a fourth rotation direction opposite to the third rotation direction by an elastic force of the locker elastic body so that the other end of the locker is separated from the locker holder.

Another aspect of the present disclosure provides an oven including a main body including a cooking chamber, a door rotatably coupled to the main body to open and close the cooking chamber, and a door locking device configured to lock the door not to be open with respect to the main body, wherein the door locking device includes a lock releasing guide configured to be fastened to a solenoid to move in a first linear direction, and a locker configured to be coupled to a locker holder provided on the door in response to the movement of the lock releasing guide.

When the lock releasing guide moves in a second linear direction, the locker may be separated from the locker holder.

The locker may include one end coming into contact with a second end of the lock releasing guide, the other end coupled to the locker holder, and a hole disposed between the one end and the other end and rotatably fitted into a shaft provided in the door locking device.

Advantageous Effects

According to an embodiment of the present disclosure, a user can open a door with a simple operation even when the door is locked not to be open.

MODE OF THE DISCLOSURE

Figure 1:
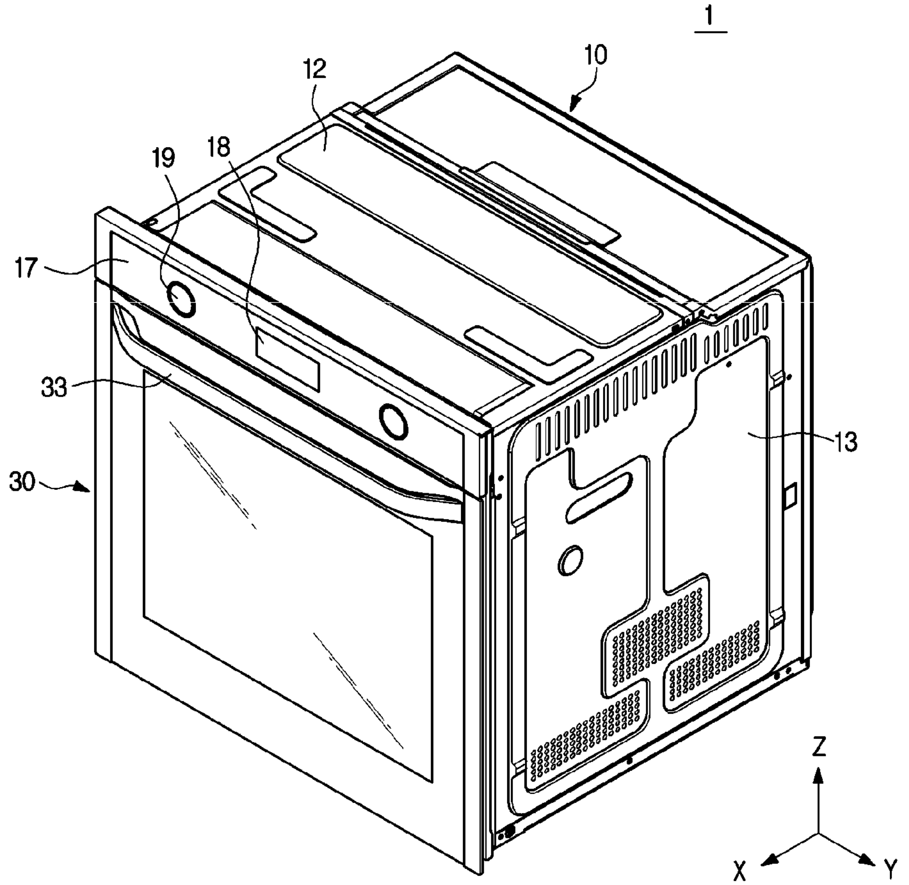
FIG. 1 is a perspective view of an oven according to an embodiment of the present disclosure.

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

In this specification, the terms "front end," "rear end," "upper portion," "lower portion," "upper end" and "lower end" used in the following description are defined with reference to the drawings, and the shape and position of each component are not limited by these terms.

Hereinafter, embodiments of the present disclosure will be described in detail with reference to the accompanying drawings.

In the following description, the term front refers to a direction in which a door is disposed based on a main body of an oven, and the term rear refers to the opposite direction to the direction in which the door is disposed based on the main body of the oven. In addition, the term upper refers to an upward direction based on the main body of the oven, and the term lower refers to a downward direction based on the main body of the oven.

Figure 2:
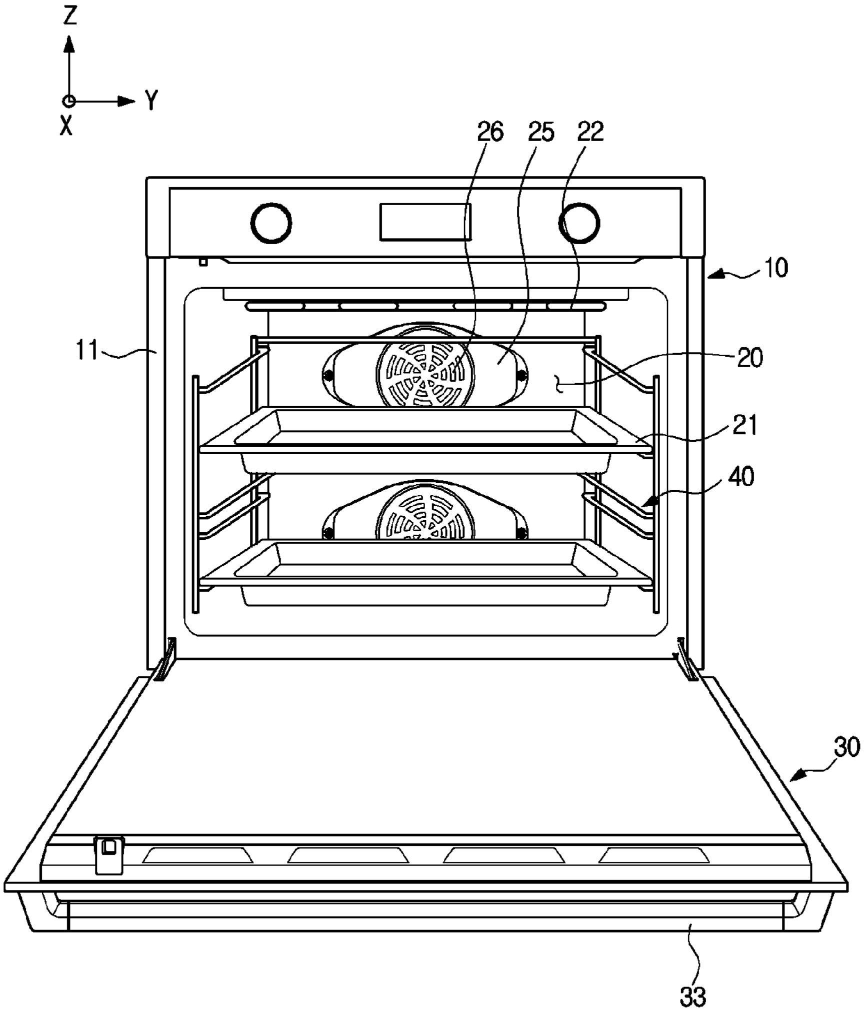
FIG. 2 illustrates a state in which a door of the oven according to an embodiment of the present disclosure is open.
Figure 3:
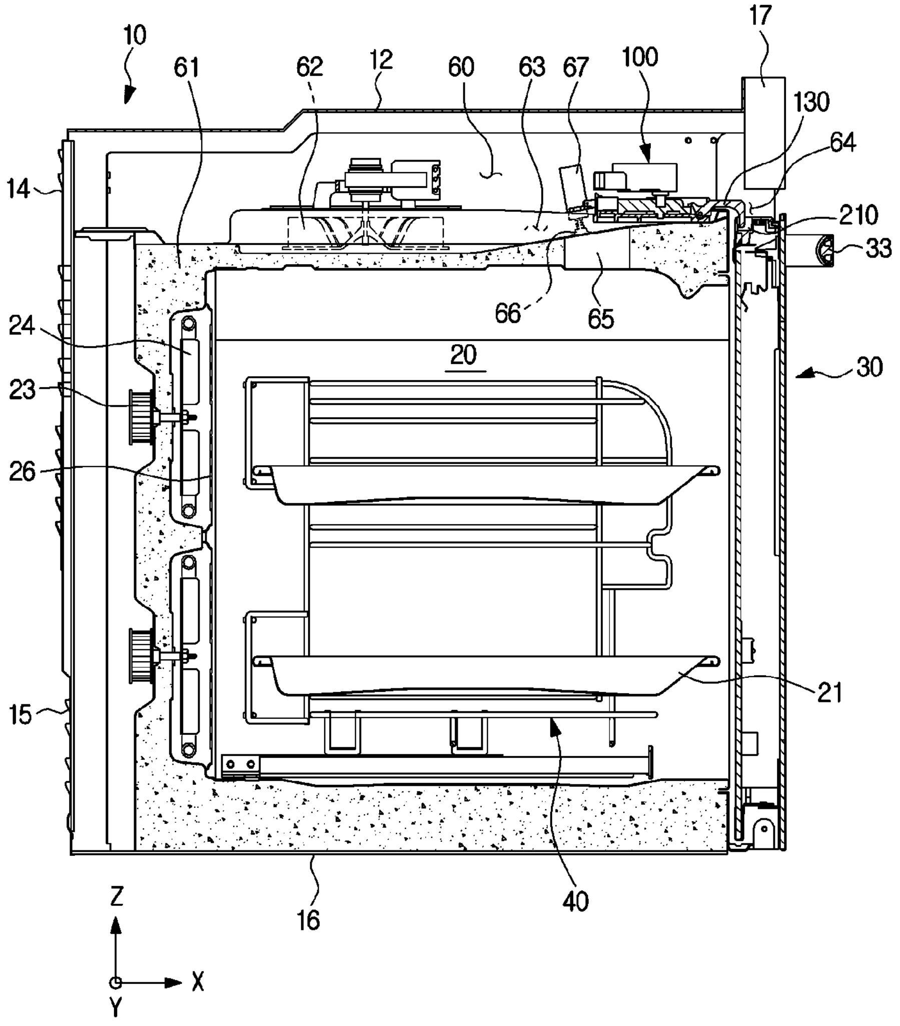
FIG. 3 is a side cross-sectional view of the oven according to an embodiment of the present disclosure.

FIG. 1 is a perspective view of an oven according to an embodiment of the present disclosure, FIG. 2 illustrates a state in which a door of the oven according to an embodiment of the present disclosure is open, and FIG. 3 is a side cross-sectional view of the oven according to an embodiment of the present disclosure.

As illustrated in FIGS. 1 to 3, an oven 1 may include a main body 10 forming an outer appearance, a cooking chamber 20 formed inside the main body 10 to have an open front, and a door 30 rotatably coupled to the main body 10 to open and close the cooking chamber 20.

According to an embodiment, the main body 10 may include a front panel 11 forming a front exterior, an upper panel 12 forming an upper exterior, a side panel 13 forming a side exterior, a rear panel 14 forming a rear exterior, and a lower panel 16 forming a lower exterior.

According to an embodiment, an electrical component room cover 17 covering a front surface of an electrical component room 60, which will be described later, may be provided on a front upper portion of the front panel 11, and a display 18 to display information on various operations of the oven and a manipulator 19 capable of manipulating the operations of the oven may be provided on the electrical component room cover 17.

According to an embodiment, a plurality of passing holes 15 may be provided in the rear panel 14 to allow air to be sucked into the electrical component room 60, and air sucked into the electrical component room 60 through the passing holes 15 may flow inside the electrical component room 60 to cool various electronic components located inside the electrical component room 60.

According to an embodiment, the cooking chamber 20 is formed inside the main body 10 to have a box shape, and a front side thereof may be open to allow food to be put in and out.

An oven rack 40 may be provided inside the cooking chamber 20 to support a plurality of shelves 21 on which food may be placed. The oven rack 40 may be moved forward and backward along rails.

A heater 22 configured to heat food is disposed in the cooking chamber 20, and the heater 22 may be an electric heater including an electric resistor.

According to an embodiment, the heater 22 is not limited to an electric heater, and may be a gas heater that generates heat by burning gas.

Thus, the oven 1 may include an electric oven and a gas oven.

According to an embodiment, a circulation fan 24 to circulate air in the cooking chamber 20 so that food is evenly heated and a circulation motor 23 to drive the circulation fan 24 may be provided in rear of the cooking chamber 20.

A fan cover 25 covering the circulation fan 24 may be provided in front of the circulation fan 24, and fan cover passing holes 26 may be formed on the fan cover 25 to allow air to flow.

According to an embodiment, the open front of the cooking chamber 20 may be opened and closed by the door 30, and the door 30 may be rotatably coupled to a lower portion of the main body 10 by a door hinge 31.

A door handle 33 that is gripped by a user may be provided at a front upper portion of the door 30 so that the cooking chamber 20 may opened and closed by the door 30.

According to an embodiment, the oven 1 may be provided with the electrical component room 60 to accommodate electronical components that control operations of various components.

According to an embodiment, the electrical component room 60 is provided above the cooking chamber 20, and an insulator 61 insulating the electrical component room 60 and the cooking chamber 20 to block heat in the cooking chamber 20 from being transferred to the electrical component room 60 may be provided between the electrical component room 60 and the cooking chamber 20.

The insulator 61 may be provided to cover the entire outside of the cooking chamber 20 so that heat in the cooking chamber 20 is not transferred to the outside of the oven 1 as well as the electrical component room 60.

According to an embodiment, because a temperature inside the electrical component room 60 may increase due to heat of various electrical components, the oven 1 may be provided with a cooling structure to cool the electrical component room 60 by circulating air through the electrical component room 60.

The cooling structure of the oven may include a cooling fan unit 62 to flow air, and a cooling passage 63 to discharge air sucked by the cooling fan unit 62 to the front of the oven.

Air outside the oven 1 may be sucked into the electrical component room 60 through the passing holes 15 formed on the rear panel 14, and the air sucked into the electrical component room 60 may flow inside the electrical component room 60 to cool the electrical components, and then may be discharged to the front of the oven through a discharge port 64 along the cooling passage 63.

A part of air in the cooking chamber 20 may be sucked into the cooling passage 63 side through an exhaust passage 65 and discharged to the front of the oven.

A bypass hole 66 may be additionally formed to allow a part of air flowing from the cooling passage 63 to the discharge port 64 to be introduced into the exhaust passage 65, and the bypass hole 66 is opened and closed by an opening/closing device 67.

Because an amount of inflow in which a part of air flowing from the cooling passage 63 to the discharge port 64 is introduced into the exhaust passage 65 is adjusted depending on the opening and closing of the bypass hole 66 by the opening/closing device 67, an amount of exhaust of being exhausted from the cooking chamber 20 to the exhaust passage 65 may be adjusted.

According to various embodiments, the oven 1 may have various states in relation to the door 30. For example, the oven 1 may be in one of a door open state, a door closed state, and a door locking state. In this case, the door closed state may be the same as the door unlocked state.

The door open state may, for example, refer to a state in which the door 30 is open so that the front of the cooking chamber 20 inside the main body 10 is open as illustrated in FIG. 2. The door closed state may, for example, refer to a state in which the door 30 is positioned adjacent to the main body 10 to close the cooking chamber 20. The door locking state may, for example, refer to a state in which the door 30 is fixed while closed by a door locking device 100, which will be described later, so that the door 30 is not open even when the user tries to open the door 30.

According to an embodiment, the oven 1 may further include a microcomputer (hereinafter, referred to as 'MICOM'). The MICOM may be located in the electrical component room 60, for example. The MICOM may include a processor, a memory, and the like. However, the present disclosure is not limited thereto.

According to an embodiment, the MICOM may control to automatically drive a door locking device 100 when a temperature in the cooking chamber 20 reaches a set temperature or higher so that a locker 130 may be coupled to a locker holder 210. In this case, the door locking device 100 may be in the door locking state. For example, in the case of performing a cleaning mode in which the inside of the cooking chamber 20 is washed, the temperature in the cooking chamber 20 may exceed about 400 degrees Celsius. In this state, the MICOM may drive the door locking device to enter the door locking state.

Figure 4A:
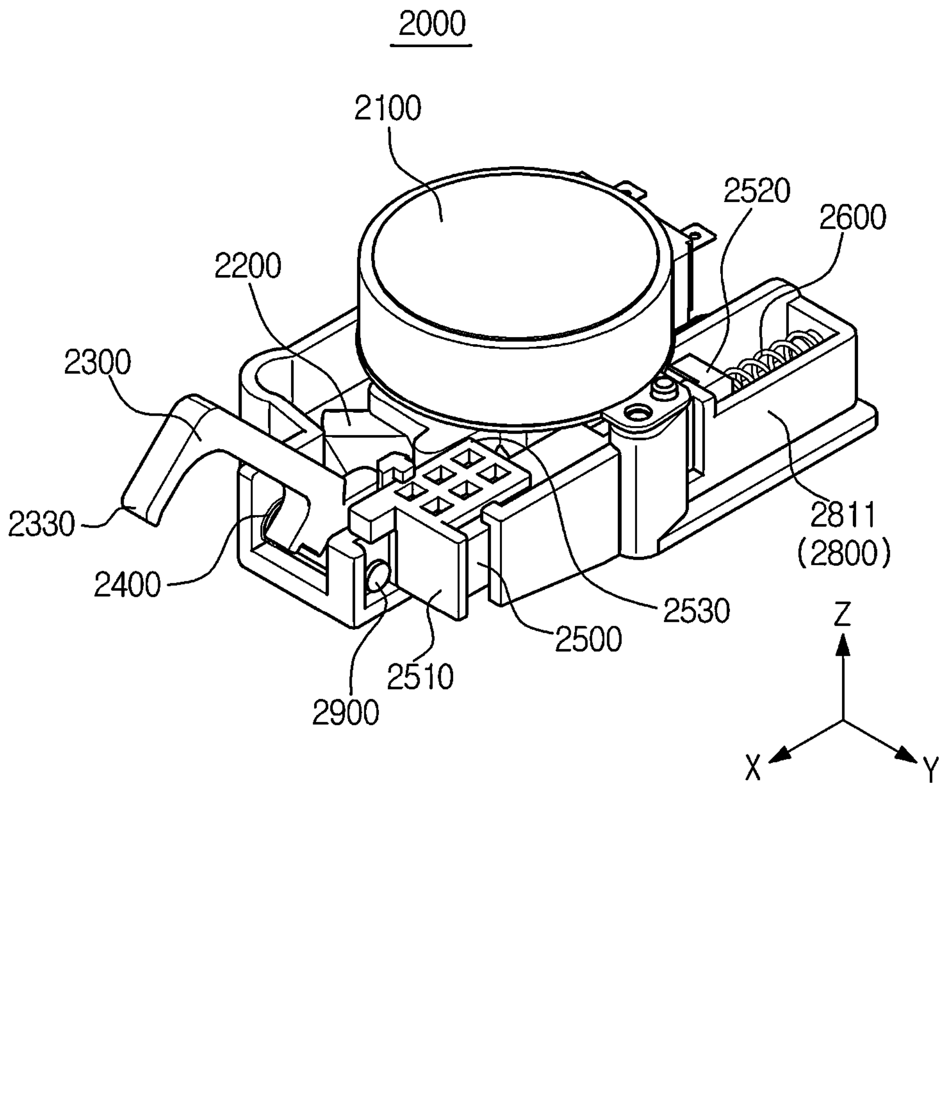
FIG. 4 is a perspective view of a door locking device according to a first embodiment of the present disclosure.
Figure 4B:
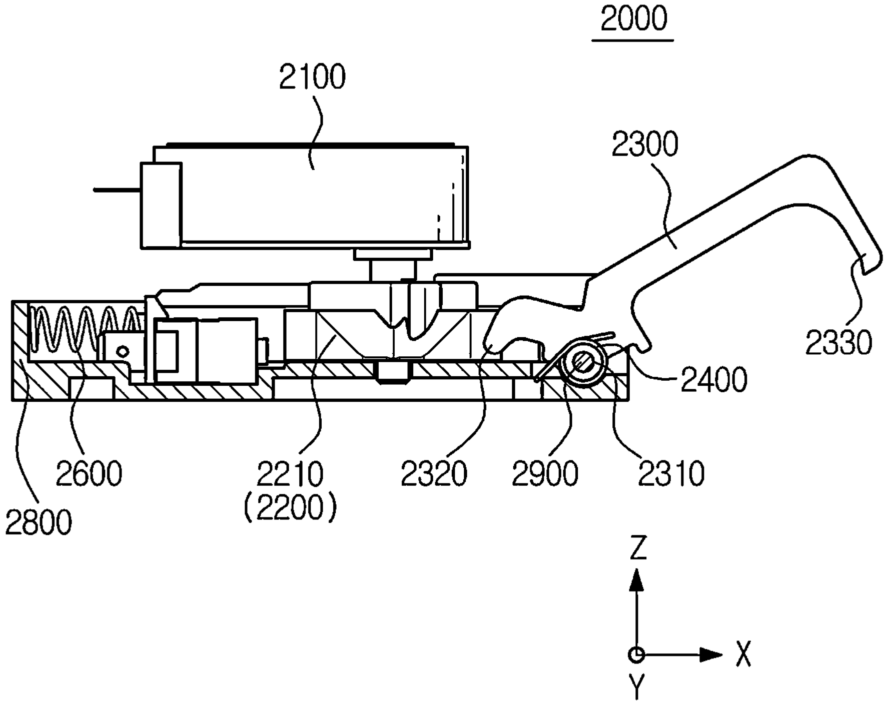

FIG. 4 is a perspective view of a door locking device according to a first embodiment of the present disclosure.

As illustrated in FIG. 4, a door locking device 2000 may include a motor 2100, a cam 2200, a locker 2300, a locker elastic body 2400, a lock releasing guide 2500, a lock releasing guide elastic body 2600, a switch 2700 (see FIG. 5), and a housing 2800. However, the present disclosure is not limited thereto, and the door locking device 2000 may further include additional components or remove some components in order to implement the effects of the present disclosure.

The housing 2800 may provide a space in which the above-described components included in the door locking device 2000 are located. As illustrated in FIG. 4, the cam 2200 may be rotatably disposed at a central portion of the housing 2800. The locker 2300 may be positioned in an X axis direction based on the cam 2200, the switch 2700 may be positioned in a –X axis direction based on the cam 2200, and the lock releasing guide 2500 may be positioned in a Y axis direction based on the cam 2200.

According to an embodiment, the motor 2100 may be positioned in a Z axis direction based on the cam 2200. That is, the cam 2200, the locker 2300, the switch 2700, and the lock releasing guide 2500 may be disposed not to exceed a height of a sidewall 2811 of the housing 2800, and the motor 2100 may be disposed to exceed the height of the sidewall 2811 of the housing 2800. With this configuration, when viewed from a side (e.g., an XZ plane), the motor 2100 may be positioned above the cam 2200 (i.e. the Z axis).

According to an embodiment, parts of the locker 2300 and the lock releasing guide 2500 may be located outside the housing 2800 through an opening provided on the sidewall 2811 of the housing 2800.

According to an embodiment, driving of the motor 2100 may be controlled by the switch 2700. A shaft (not shown) included in the motor 2100 and the cam 2200 may be physically connected to each other. For example, the shaft coupled to the cam 2200 may be rotated by the driving of the motor 2100, and thereby the cam 2200 may be rotated. Also, the shaft and the cam 2200 may be connected to each other by a connection structure such as a gear, so that the shaft may be rotated by the driving of the motor 2100, and a rotational force of the shaft may be transmitted to the cam 2200 through the connection structure to rotate the cam 2200.

According to an embodiment, the cam 2200 may be provided to be rotatable. Specifically, the cam 2200 may be rotated by being physically connected to the motor 2100. The cam 2200 may be rotated, for example, in a first rotation direction or a second rotation direction opposite to the first rotation direction by the driving of the motor 2100. As an example, the first rotation direction may be a clockwise direction, and the second rotation direction may be a counterclockwise direction. In this embodiment, a description will be given centering on the cam 2200 rotated in the first rotation direction by the driving of the motor 2100.

According to various embodiments, the cam 2200 may include a cam body 2210. According to various embodiments, the cam 2200 may include a cam body 2210, a plurality of first contact parts 2220 formed at an upper portion of the cam body 2210 in the Z axis direction, and a plurality of second contact parts 2230 formed at a lower portion of the cam body 2210 in the Z axis direction. Suitably, the cam body 2210, the plurality of first contact parts 2220, and the plurality of second contact parts 2230 may be integrally formed. The plurality of first contact parts 2220 may extend radially from the cam body 2210. The plurality of second contact parts 2230 may extend radially from the cam body 2210. As an example, the plurality of first contact parts 2220 may be configured as four first contact parts, and the plurality of second contact parts 2230 may be configured as four second contact parts. However, the number of the plurality of first contact parts 2220 and the number of the plurality of second contact parts 2230 are not limited to the above example and may be variously changed. As such, when the cam 2200 is designed to have a plurality of first contact parts and a plurality of second contact parts, the time required for the door lock and door unlock cycles may be reduced.

The plurality of first contact parts 2220 may be smaller than the plurality of second contact parts 2230. In other words, the plurality of second contact parts 2230 may extend further outward of the cam body 2210 than the plurality of first contact parts 2220 so that one ends 2231 of the plurality of second contact parts 2230 is positioned outside one ends 2221 of the plurality of first contact parts 2220.

The plurality of first contact parts 2220 may be disposed to be spaced apart from each other. The plurality of first contact parts 2220 and the plurality of second contact parts 2230 may be disposed not to overlap each other. That is, the plurality of first contact parts 2220 and the plurality of second contact parts 2230 may be alternately disposed with each other.

The plurality of first contact parts 2220 may be provided to selectively come into contact with the lock releasing guide 2500. In other words, the one ends 2221 of the plurality of first contact parts 2220 may be provided to selectively come into contact with the lock releasing guide 2500. Rotation of the cam 2200 may be restricted by the plurality of first contact parts 2220 coming into contact with the lock releasing guide 2500. Rotation of the cam 2200 may be restricted by the plurality of first contact parts 2220 coming into contact with the lock releasing guide 2500. Specifically, when the plurality of first contact parts 2220 and the lock releasing guide 2500 come into contact with each other, rotation of the cam 2200 may be restricted. On the contrary, when the plurality of first contact parts 2220 and the lock releasing guide 2500 are separated from each other and the contact is released, the cam 2200 may rotate.

The plurality of second contact parts 2230 may be provided to come into contact with the locker 2300. In other words, the one ends 2231 of the plurality of second contact parts 2230 may be provided to come into contact with the locker 2300. The one ends 2231 of the plurality of second contact parts 2230 may selectively come into contact with the locker 2300 as the cam 2200 rotates. When the one ends 2231 of the plurality of second contact parts 2230 come into contact with the locker 2300 as the cam 2200 rotates, the locker 2300 may be coupled to the locker holder 210 (e.g., the locker holder 210 of FIG. 3) provided on the door 30. On the contrary, when the contact between the one ends 2231 of the plurality of second contact parts 2230 and the locker 2300 is released as the cam 2200 rotates, the locker 2300 may be separated from the locker holder 210 provided in the door 30.

According to an embodiment, the locker 2300 may include a hole 2310 to which a shaft 2900 may be rotatably fitted, one end 2320 coming into contact with the one ends 2231 of the plurality of second contact parts 2230 of the cam 2200, and the other end 2330 that is inserted into the locker holder 210. The one end 2320 and the hole 2310 of the locker 2300 may be located inside the housing 2800, and at least a portion of the other end 2330 of the locker 2300 may be located outside the housing 2800.

The locker 2300 may be rotatably fitted into the shaft 2900 provided at a part of the housing 2800 using the hole 2310 and may rotate in a third rotation direction or a fourth rotation direction opposite to the third rotation direction in response to the rotation of the cam 2200. In response to the rotation of the cam 2200, the one end 2320 of the locker 2300 may come into contact with the one ends 2231 of the plurality of second contact parts 2230 of the cam 2200. The one end 2320 of the locker 2300 may include, for example, an inclined surface. In response to the rotation of the cam 2200, the other end 2330 of the locker 2300 may be coupled to the locker holder 210 or separated from the locker holder 210. The other end 2330 of the locker 2300 may have a "⌉," shape.

According to various embodiments, the locker elastic body 2400 may be further fitted into the shaft 2900 on which the locker 2300 is fitted. The locker elastic body 2400 may provide an elastic force in the third or fourth rotation direction with respect to the locker 2300. The locker elastic body 2400 may also provide an elastic force for pushing the locker 2300 in one direction along the direction of the shaft 2900 with respect to the locker 2300.

According to an embodiment, the lock releasing guide 2500 may include one end 2510 located outside the housing 2800, the other end 2520 located inside the housing 2800, and a support part 2530 located between the one end 2510 and the other end 2520 and coming into contact with the plurality of first contact parts 2220 of the cam 2200.

The lock releasing guide elastic body 2600 may be disposed between the lock releasing guide 2500 and one wall of the housing 2800 facing the lock releasing guide 2500. Specifically, the lock releasing guide elastic body 2600 may be disposed between the other end 2520 of the lock releasing guide 2500 and one wall of the housing 2800 facing the other end 2520 of the lock releasing guide 2500. One end of the lock releasing guide elastic body 2600 may be fastened to the other end 2520 of the lock releasing guide 2500, and the other end of the lock releasing guide elastic body 2600 may be fastened to one wall of the housing 2800. The lock releasing guide 2500 may move linearly in a first linear direction by an elastic force of the lock releasing guide elastic body 2600 so that he support part 2530 of the lock releasing guide 2500 and the one ends 2221 of the plurality of first contact parts 2220 of the cam 2200 do not come into contact with each other. The first linear direction may be, for example, a direction in which the one end 2510 of the lock releasing guide 2500 moves away from the housing 2800. Or, the first linear direction may be the X axis direction. As such, as long as an external force is not applied to the lock releasing guide 2500, the lock releasing guide 2500 may move linearly in the first linear direction by the elastic force of the lock releasing guide elastic body 2600 to protrude to the outside of the housing 2800. Because the contact between the lock releasing guide 2500 and the plurality of first contact parts 2220 of the cam 2200 is released when the lock releasing guide 2500 moves linearly in the first linear direction to protrude to the outside of the housing 2800, the cam 2200 may rotate freely.

According to various embodiments, the lock releasing guide 2500 may be disposed on the housing 2800 to be linearly movable. When the lock releasing guide 2500 moves linearly in the first linear direction, the support part 2530 of the lock releasing guide 2500 and the plurality of first contact parts 2220 may be spaced apart from each other. That is, the cam 2200 may rotate as the contact between the lock releasing guide 2500 and the plurality of first contact parts 2220 is released.

According to various embodiments, when an external force is applied to the lock releasing guide 2500 so that the lock releasing guide 2500 moves linearly in the second linear direction opposite to the first linear direction, the plurality of first contact parts 2220 of the cam 2200 may be pressed in the second linear direction in a state of being in contact with the support part 2530 of the lock releasing guide 2500. At this time, the cam 2200 may rotate in the second rotation direction by the interaction between the support part 2530 of the lock releasing guide 2500 and the one ends 2221 of the plurality of first contact parts 2220 of the cam 2200. The lock releasing guide elastic body 2600 may be contracted by an external force applied to the lock releasing guide 2500. When an external force is applied to the lock releasing guide 2500 and the lock releasing guide 2500 moves linearly in the second linear direction, the contact between the one end 2320 of the locker 2300 and the one ends 2231 of the plurality of second contact parts 2230 of the cam 2200 is released, so that the locker 2300 may rotate in the fourth rotation direction. As a result, the other end 2330 of the locker 2300 may be separated from the locker holder 210.

FIG. 5 illustrates operations of the door locking device according to the first embodiment of the present disclosure. For reference, in FIG. 5, because the motor 2100 of the door locking device 2000 is disposed to overlap the cam 2200 in the Z axis direction, the motor 2100 is indicated by a dashed-dotted line to describe the operations of the cam 2200.

Figure 5A:
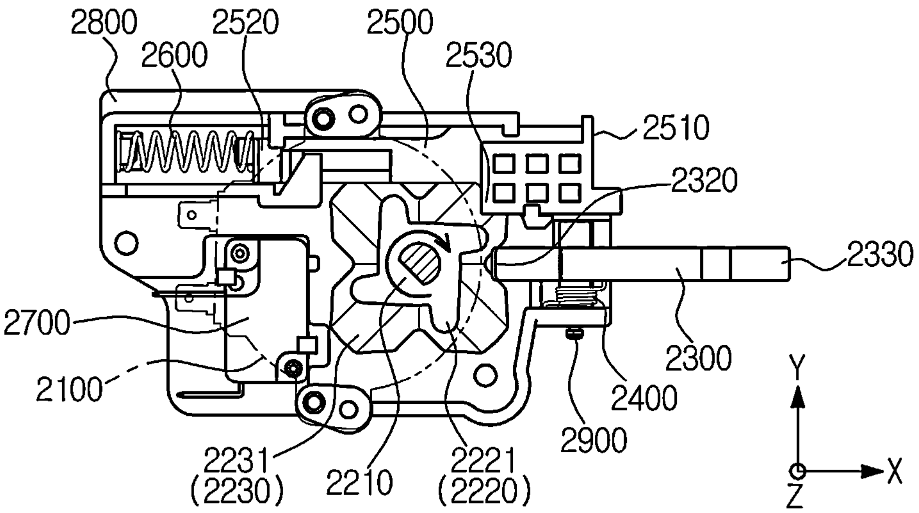
FIG. 5 illustrates operations of the door locking device according to the first embodiment of the present disclosure.

FIG. 5A may be in a door locking state.

As illustrated in FIG. 5A, because the lock releasing guide 2500 is in a state of being moved linearly in the first linear direction by the elastic force of the lock releasing guide elastic body 2600, the cam 2200 may freely rotate in the first rotation direction. The one end 2320 of the locker 2300 may come into contact with the one ends 2231 of the plurality of second contact parts 2230 of the cam 2200. That is, the one end 2320 of the locker 2300 may come into contact with the one ends 2231 of the plurality of second contact parts 2230 of the cam 2200. When the one end 2320 of the locker 2300 and the one ends 2231 of the plurality of second contact parts 2230 of the cam 2200 come into contact with each other, the locker 2300 may rotate in the third rotation direction about the shaft 2900. The third rotation direction may be, for example, the clockwise direction. Or, the third rotation direction may be a rotation direction from the Z axis to the X axis. As the locker 2300 rotates in the third rotation direction, the other end 2330 of the locker 2300 may be coupled to the locker holder 210.

According to various embodiments, the locker 2300 may be in a state of receiving an elastic force in the fourth rotation direction by the locker elastic body 2400. The fourth rotation direction may be, for example, the counterclockwise direction. Or, the fourth rotation direction may be a rotation direction from the X axis to the Z axis. That is, the locker 2300 may overcome the elastic force of the locker elastic body 2400 by using the force transmitted to the locker 2300 by the rotation of the cam 2200 and rotate in the third rotation direction.

As described above with reference to FIG. 3, as the door locking device 2000 is provided in the main body 10 of the oven 1 and the locker holder 210 is provided in a door (e.g., the door 30 of FIG. 1), when the locker 2300 is coupled to the locker holder 210, the oven 1 becomes in the door locking state, and thereby is in a state of being not open even by an external force of a user who attempts to open the door 30.

According to various embodiments, inclined surfaces may be provided at the one ends 2231 of the plurality of second contact parts 2230 of the cam 2200 and the one end 2320 of the locker 2300, respectively. With this configuration, kinetic energy may be transferred with a minimized resistance force to the one ends 2231 of the plurality of second contact parts 2230 of the cam 2200 and the one end 2320 of the locker 2300.

Figure 5B:
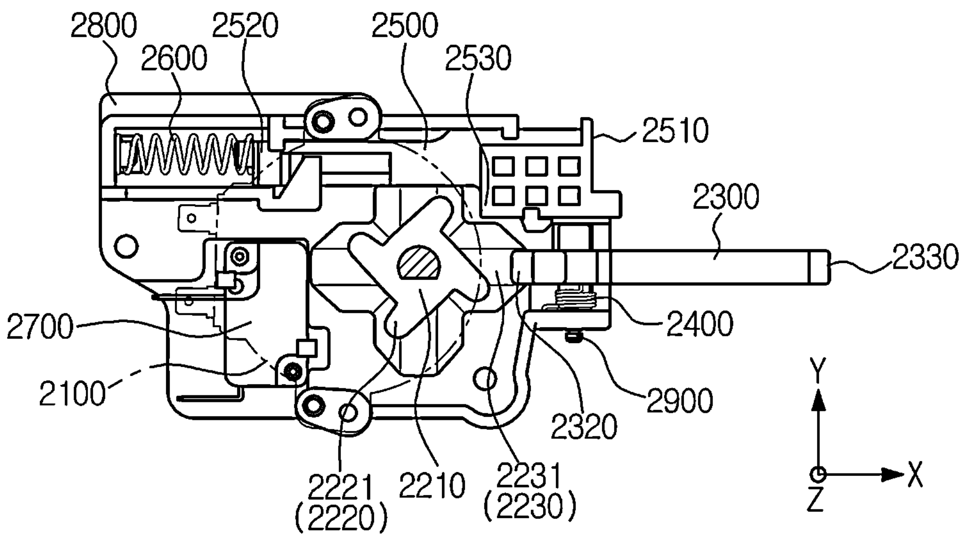

FIG. 5B may be in a door-lock releasing state.

As illustrated in FIG. 5B, because the lock releasing guide 2500 is in a state of being moved linearly in the first linear direction by the elastic force of the lock releasing guide elastic body 2600, the cam 2200 may freely rotate in the first rotation direction. The one end 2320 of the locker 2300 may not come into contact with the one ends 2231 of the plurality of second contact parts 2230 of the cam 2200. That is, the one end 2320 of the locker 2300 may not come into contact with the one ends 2231 of the plurality of second contact parts 2230 of the cam 2200. When the one end 2320 of the locker 2300 and the one ends 2231 of the plurality of second contact parts 2230 of the cam 2200 does not come into contact with each other, the locker 2300 may rotate in the fourth rotation direction about the shaft 2900. The fourth rotation direction may be, for example, the counterclockwise direction. Or, the fourth rotation direction may be the rotation direction from the X axis to the Z axis. As the locker 2300 rotates in the fourth rotation direction, the other end 2330 of the locker 2300 may be separated from the locker holder 210.

According to various embodiments, as described above, the oven 1 may automatically drive the door locking device 2000 in a specific mode to enter the door locking state in which the door 30 is not open. However, when the power to the oven 1 is cut off in the door locking state, the door 30 needs to be forcibly open. The door locking device according to an embodiment of the present disclosure may release the door locking state as needed using the lock releasing guide 2500.

Figure 5C:
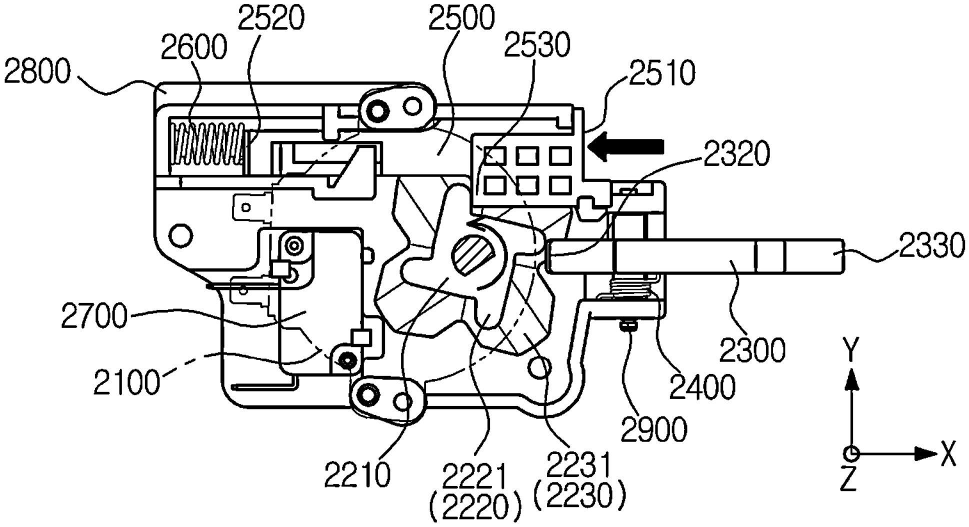

As illustrated in FIG. 5C, the lock releasing guide 2500 may move in the second linear direction. For example, a user may move the lock releasing guide 2500 in the second linear direction. The second linear direction may be, for example, a direction in which the one end 2510 of the lock releasing guide 2500 approaches the housing 2800. Or, the second linear direction may be the −X axis direction.

When the user applies an external force sufficient to overcome the elastic force of the lock releasing guide elastic body 2600 to move the lock releasing guide 2500 in the second linear direction, the support part 2530 of the lock releasing guide 2500 may transfer kinetic energy to the one ends 2221 of the plurality of first contact parts 2220 of the cam 2200, and thereby the cam 2200 may be rotated in the second rotation direction. The second rotation direction may be, for example, the counterclockwise direction. Or, the second rotation direction may be a rotation direction from the X axis to the Y axis.

When the support part 2530 of the lock releasing guide 2500 and the one ends 2221 of the plurality of first contact parts 2220 of the cam 2200 come into contact with each other as the lock releasing guide 2500 moves in the second linear direction, the contact between the one end 2320 of the locker 2300 and the one ends 2231 of the plurality of second contact parts 2230 of the cam 2200 may be released. Accordingly, the locker 2300 may rotate in the fourth rotation direction. The fourth rotation direction may be, for example, the counterclockwise direction. Or, the fourth rotation direction may be the rotation direction from the X axis to the Z axis.

According to various embodiments, when the one end 2320 of the locker 2300 is separated from the one ends 2231 of the plurality of second contact parts 2230 of the cam 2200, the locker 2300 may rotate in the fourth rotation direction by the locker elastic body 2400 that is providing the elastic force in the fourth rotation direction. The other end 2330 of the locker 2300 may be separated from the locker holder 210. Accordingly, the oven 1 may be changed to the door-lock releasing state.

As such, the oven 1 according to an embodiment of the present disclosure may provide the door locking device 2000 capable of minimizing the number of parts through the adjacent arrangement of the cam 2200 and the locker 2300 and capable of reducing a space occupied by the door locking device 2000 through an overlapping structure of the motor 2100 and the cam 2200 and easily changing the door locking state and the door-lock releasing state.

FIG. 6 is a perspective view of a door locking device according to a second embodiment of the present disclosure.

Referring to FIG. 6, the door locking device 100 may include a motor 110, a cam 120, the locker 130, a locker elastic body 132, a lock releasing guide 140, a switch 150, and a housing 160. However, the present disclosure is not limited thereto, and the door locking device 100 may further include additional components or remove some components in order to implement the effects of the present disclosure.

Figure 6A:
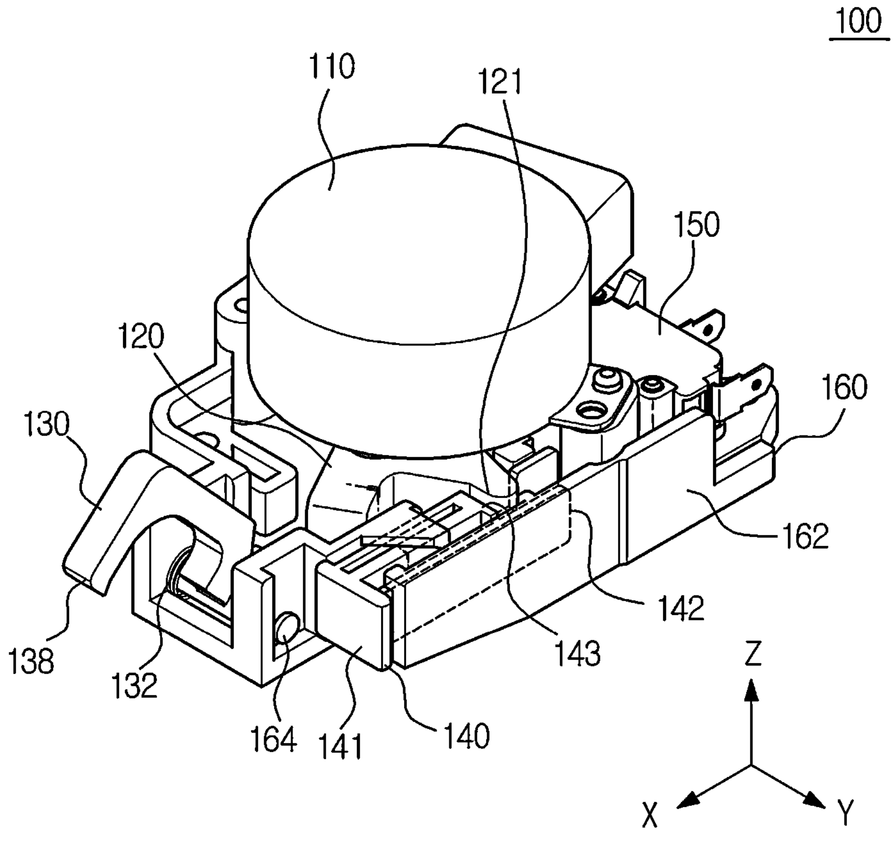
FIG. 6 is a perspective view of a door locking device according to a second embodiment of the present disclosure.
Figure 6B:
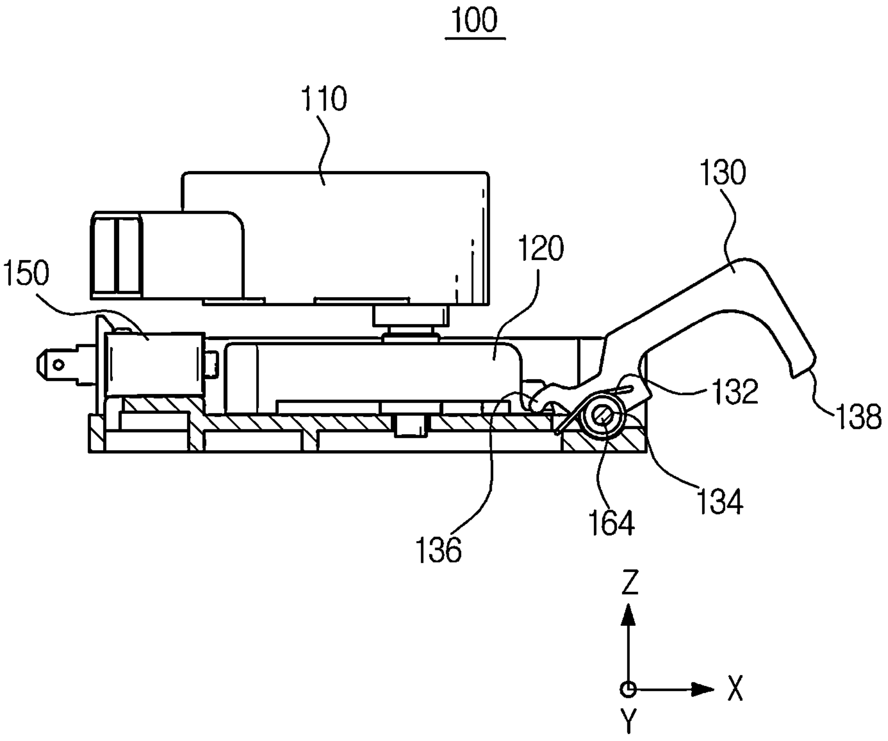

The housing 160 may provide a space in which the above-described components included in the door locking device 100 are located. Referring to FIGS. 6A and 6B, the cam 120 may be rotatably disposed at a central portion of the housing 160. The locker 130 may be positioned in the X axis direction based on the cam 120, the switch 150 may be positioned in the −X axis direction based on the cam 120, and the lock releasing guide 140 may be positioned in the Y axis direction based on the cam 120.

According to an embodiment, the motor 110 may be positioned in the Z axis direction based on the cam 120. That is, the cam 120, the locker 130, the switch 150, and the lock releasing guide 140 may be disposed not to exceed a height of a sidewall 162 of the housing 160, and the motor 110 may be disposed to exceed the height of the sidewall 162 of the housing 160. With this configuration, when viewed from a side (e.g., the XZ plane), the motor 110 may be positioned above the cam 120 (i.e. the Z axis).

According to an embodiment, parts of the locker 130 and the lock releasing guide 140 may be located outside the housing 160 through an opening formed on the sidewall 162 of the housing 160.

According to an embodiment, driving of the motor 110 may be controlled by the switch 150. A shaft (not shown) included in the motor 110 and the cam 120 may be physically connected to each other. For example, the shaft coupled to the cam 120 may be rotated by the driving of the motor 110, and thereby the cam 120 may be rotated. Also, the shaft and the cam 120 may be connected to each other by a connection structure such as a gear, so that the shaft may be rotated by the driving of the motor 110, and a rotational force of the shaft may be transmitted to the cam 120 through the connection structure to rotate the cam 120.

According to an embodiment, the cam 120 may be rotated by being physically connected to the motor 110. The cam 120 may be rotated, for example, for example, in the first rotation direction or the second rotation direction opposite to the first rotation direction by the driving of the motor 110.

According to various embodiments, the cam 120 may include a first end 121 and a second end 122. The first end 121 may come into contact with a portion of the lock releasing guide 140 when the cam 120 rotates. The second end 122 may come into contact with a portion of the locker 130 when the cam 120 rotates. Accordingly, when the cam 120 rotates, the movement of the lock releasing guide 140 and the locker 130 may occur.

According to an embodiment, the locker 130 may include a hole 134 to which a shaft 164 may be rotatably fitted, one end 136 coming into contact with the first end 121 of the cam 120, and the other end 138 that is inserted into a locker holder (e.g., the locker holder 210). The one end 136 and the hole 132 of the locker 130 may be located inside the housing 160, and at least a portion of the other end 138 of the locker 130 may be located outside the housing 160.

The locker 130 may be rotatably fitted into the shaft 164 provided at a part of the housing 160 using the hole 134 and may rotate in the third rotation direction or the fourth rotation direction opposite to the third rotation direction in response to the rotation of the cam 120. In response to the rotation of the cam 120, the one end 136 of the locker 130 may come into contact with the second end 122 of the cam 120. The one end 136 of the locker 130 may include, for example, an inclined surface. In response to the rotation of the cam 120, the other end 138 of the locker 130 may be coupled to the locker holder (not shown) or separated from the locker holder 210. The other end 138 of the locker 130 may have a "]" shape.

According to various embodiments, the locker elastic body 132 may be further fitted into the shaft 162 to which the locker 130 is fitted into. The locker elastic body 132 may provide an elastic force in the first or second rotation direction with respect to the locker 130. The locker elastic body 132 may also provide an elastic force for pushing the locker 130 in one direction along the direction of the shaft 162 with respect to the locker 130.

According to an embodiment, the lock releasing guide 140 may include one end 141 located outside the housing 160, the other end 142 located inside the housing 160, and a support part 143 located between the one end 141 and the other end 142 and coming into contact with the first end 121 of the cam 120.

According to various embodiments, the lock releasing guide 140 may be disposed on the housing 160 to be linearly movable. For example, in response to the rotation of the cam 120, the support part 143 may come into contact with the first end 121 of the cam 120, and the lock releasing guide 140 may move linearly in the first linear direction. The first linear direction may be, for example, a direction in which the one end 141 of the lock releasing guide 140 moves away from the housing 160. Or, the first linear direction may be the X axis direction.

According to various embodiments, when the one end 141 of the lock releasing guide 140 moves linearly by an external force, the cam 120 may rotate in the second rotation direction opposite to the first rotation direction. For example, when a user applies a force in a direction opposite to the first linear direction with respect to the one end 141 of the lock releasing guide 140, the support part 143 may transmit the external force to the first end 121 of the cam 120, and thereby the cam 120 may rotate in the second rotation direction.

FIG. 7 illustrates operations of the door locking device according to the second embodiment of the present disclosure.

Referring to FIG. 7, because the motor 110 of the door locking device 100 is disposed to overlap the cam 120 in the Z axis direction, the motor 110 is indicated by a dashed-dotted line to describe the operations of the cam 120.

Figure 7A:
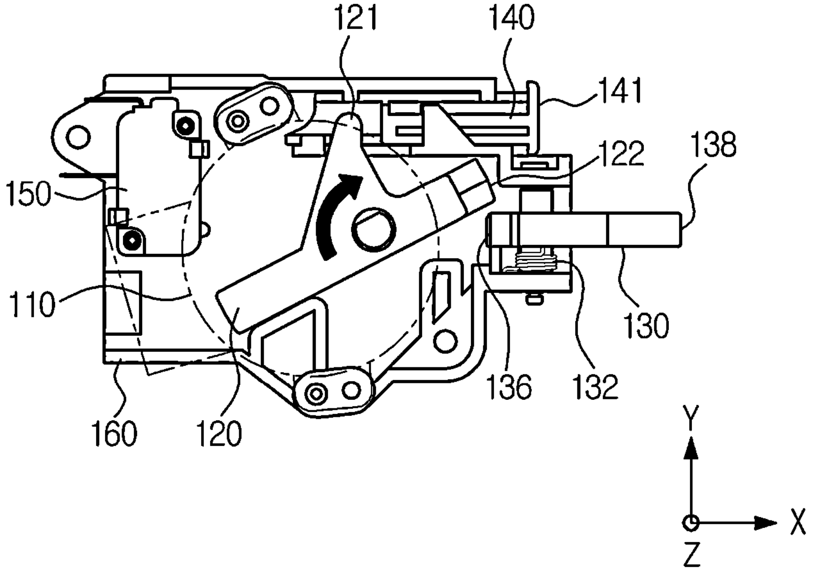
FIG. 7 illustrates operations of the door locking device according to the second embodiment of the present disclosure.

FIG. 7A may be in a door-lock releasing state.

Referring to FIG. 7A, the one end 136 of the locker 130 may be in a state of not being in contact with the second end 122 of the cam 120. The locker 130 may be in a state of receiving an elastic force in the fourth rotation direction by the locker elastic body 132. The fourth rotation direction may be, for example, the counterclockwise direction. Or, the fourth rotation direction may be the rotation direction from the X axis to the Z axis.

According to an embodiment, most of the lock releasing guide 140 may be located inside the housing 160. Therefore, in this case, even when the user applies an external force to the one end 141 of the lock releasing guide 140, the lock releasing guide 140 may not move.

Figure 7B:
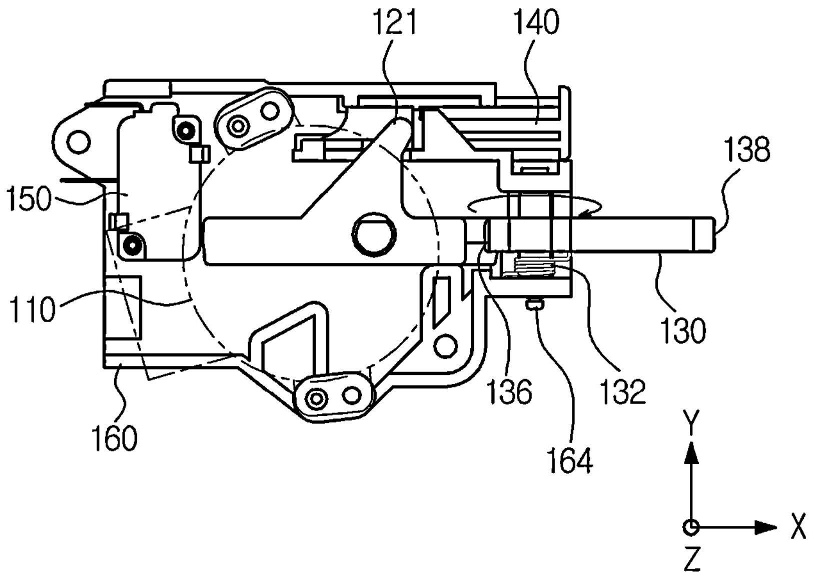

FIG. 7B may be in a door locking state.

Referring to FIGS. 7A and 7B, the cam 120 may rotate in the first rotation direction by the driving of the motor 110.

The first rotation direction may be, for example, the clockwise direction. Or, the first rotation direction may be a rotation direction from the Y axis to the X axis. In response to the rotation of the cam 120, the second end 122 of the cam 120 may transfer kinetic energy to the one end 136 while coming into contact with the one end 136 of the locker 130. For example, the second end 122 of the cam 120 may come into contact with a lower end of the one end 136 of the locker 130.

As the cam 120 rotates in the first rotation direction, a contact area between the second end 122 and the one end 136 of the locker 130 may increase. Accordingly, the locker 130 may rotate in the third rotation direction about the shaft 164. The third rotation direction may be, for example, the clockwise direction. Or, the third rotation direction may be the rotation direction from the Z axis to the X axis. As the locker 130 rotates in the third rotation direction, the other end 138 of the locker 130 may be coupled to a locker holder (e.g., the locker holder 210 of FIG. 3).

According to various embodiments, the locker 130 may be in a state of receiving an elastic force in the fourth rotation direction by the locker elastic body 132. The fourth rotation direction may be, for example, the counterclockwise direction. Or, the fourth rotation direction may be the rotation direction from the X axis to the Z axis. That is, the locker 130 may overcome the elastic force by using the force transmitted to the locker 130 by the rotation of the cam 120 and rotate in the third rotation direction.

As described above with reference to FIG. 3, as the door locking device 100 is provided in the main body 10 of the oven 1 and the locker holder 210 is provided in a door (e.g., the door 30 of FIG. 1), when the locker 130 is coupled to the locker holder 210, the oven 1 becomes in the door locking state, and thereby is in a state of being not open even by an external force of a user who attempts to open the door 30.

According to various embodiments, inclined surfaces may be provided at the second end 122 and the one end 136 of the locker 130, respectively. With this configuration, kinetic energy may be transferred with a minimized resistance force to the second end 122 and the one end 136 of the locker 130.

As the cam 120 rotates in the first rotation direction, the first end 121 may transfer kinetic energy to the support part 143 while coming into contacting with the support part 143 of the lock releasing guide 140. The lock releasing guide 140 may move in the first linear direction by the kinetic energy transferred through the support part 143. The first linear direction may be, for example, a direction in which the one end 141 of the lock releasing guide 140 moves away from the housing 160. Or, the first linear direction may be the X axis direction.

According to various embodiments, as described above, the oven 1 may automatically drive the door locking device 100 in a specific mode to enter the door locking state in which the door 30 is not open. However, when the power to the oven 1 is cut off in the door locking state, the door 30 needs to be forcibly open. The door locking device according to an embodiment of the present disclosure may release the door locking state as needed using the lock releasing guide 140.

Referring to FIGS. 7C and 7D, the lock releasing guide 140 may move in the second linear direction. For example, a user may move the lock releasing guide 140 in the second linear direction. The second linear direction may be, for example, a direction in which the one end 141 of the lock releasing guide 140 approaches the housing 160. Or, the second linear direction may be the −X axis direction.

Referring to FIGS. 7C and 7D, in response to the movement of the lock releasing guide 140 in the second linear direction, the cam 120 may rotate in the second rotation direction. For example, the support part 143 of the lock releasing guide 140 may transfer kinetic energy to the first end 121 of the cam 120, and thereby the cam 120 may rotate in the second rotation direction. The second rotation direction may be, for example, the counterclockwise direction. Or, the second rotation direction may be the rotation direction from the X axis to the Y axis.

According to an embodiment, as the cam 120 rotates in the second rotation direction, a contact area between the one end 136 of the locker 130 and the second end 122 of the cam 120 may gradually decrease. Accordingly, the locker 130 may rotate in the fourth rotation direction. The fourth rotation direction may be, for example, the counterclockwise direction. Or, the fourth rotation direction may be the rotation direction from the X axis to the Z axis.

According to various embodiments, as the contact area between the second end 122 of the cam 120 and the one end 136 of the locker 130 decreases, the locker 130 may rotate in the fourth rotation direction by the locker elastic body 132 that is providing the elastic force in the fourth rotation direction. The other end 138 of the locker 130 may be separated from the locker holder 210. Accordingly, the oven 1 may be changed to the door-lock releasing state.

As such, the oven 1 according to an embodiment of the present disclosure may provide the door locking device 100 capable of minimizing the number of parts through the adjacent arrangement of the cam 120 and the locker 130 and capable of reducing a space occupied by the door locking device 100 through an overlapping structure of the motor 110 and the cam 120 and easily changing the door locking state and the door-lock releasing state.

FIG. 8 illustrates operations of releasing a door lock state in a door locking device according to a third embodiment of the present disclosure.

Figure 8A:
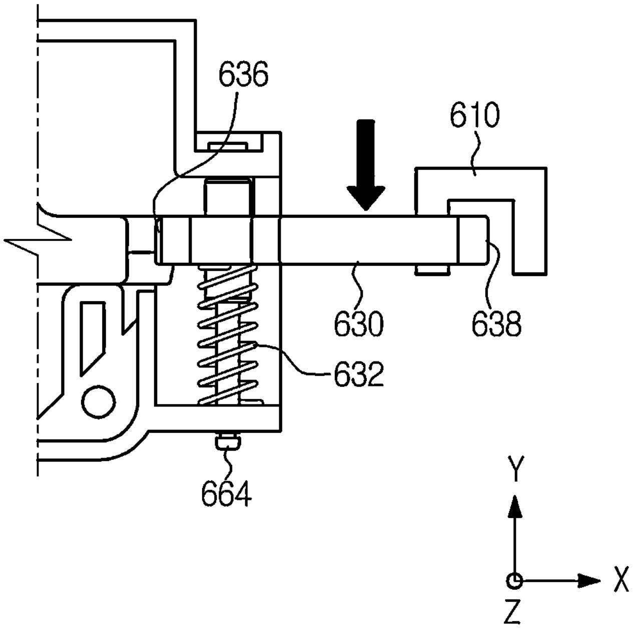
FIG. 8 illustrates operations of releasing a door lock state in a door locking device according to a third embodiment of the present disclosure.

FIG. 8A illustrates the other end 638 of a locker 630, a shaft 664 to and on which the locker 630 is coupled and rotates, a locker holder 610, and an elastic body 632 fitted into the shaft 664 among the door locking device 100.

Referring to FIG. 8A-1, the door locking device 100 may be in a door locking state. That is, the other end 638 of the locker 630 may be in a state of being coupled to the locker holder 610. The locker 630 receives an elastic force in the Y axis direction along the direction of the shaft 664 by the elastic body 632.

Referring to FIG. 8A-2, the locker 630 may move in a −Y axis direction while resisting the elastic force. For example, a user may move the locker 630 in the −Y axis direction. When the locker 630 moves in the −Y axis direction, the other end 638 of the locker 630 may be separated from the locker holder 610. As the other end 638 of the locker 630 is separated from the locker holder 610, the door locking device 630 may be changed from the door locking state to the door-lock releasing state.

Figure 8B:
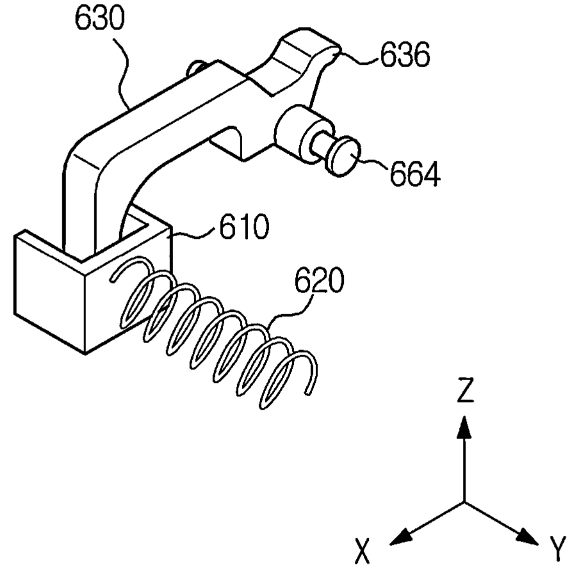

FIG. 8B illustrates the other end 638 of the locker, the shaft 664 on which the locker rotates, the locker holder 610, and a locker holder elastic body 630.

Referring to FIG. 8B-1, the door locking device 630 may be in the door locking state. That is, the other end 638 of the locker 630 may be in the state of being coupled to the locker holder 610. The locker holder 610 receives an elastic force in the −Y axis direction by the locker holder elastic body 620.

Referring to FIG. 8B-2, the locker holder 610 may move in the Y axis direction while resisting the elastic force. For example, the user may move the locker holder 610 in the Y axis direction. When the locker holder 610 moves in the Y axis direction, the other end 638 of the locker 630 may be separated from the locker holder 610. As the other end 638 of the locker 630 is separated from the locker holder 610, the door locking device 630 may be changed from the door locking state to the door-lock releasing state.

Figure 9A:
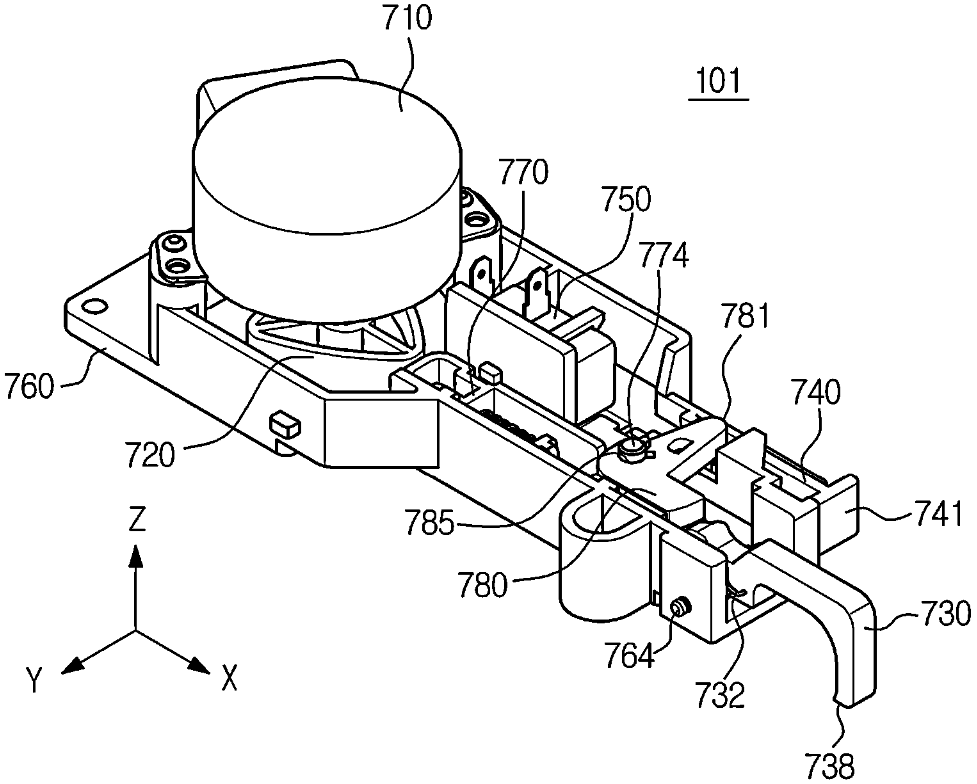
FIG. 9 is a perspective view of a door locking device according to a fourth embodiment of the present disclosure.
Figure 9B:
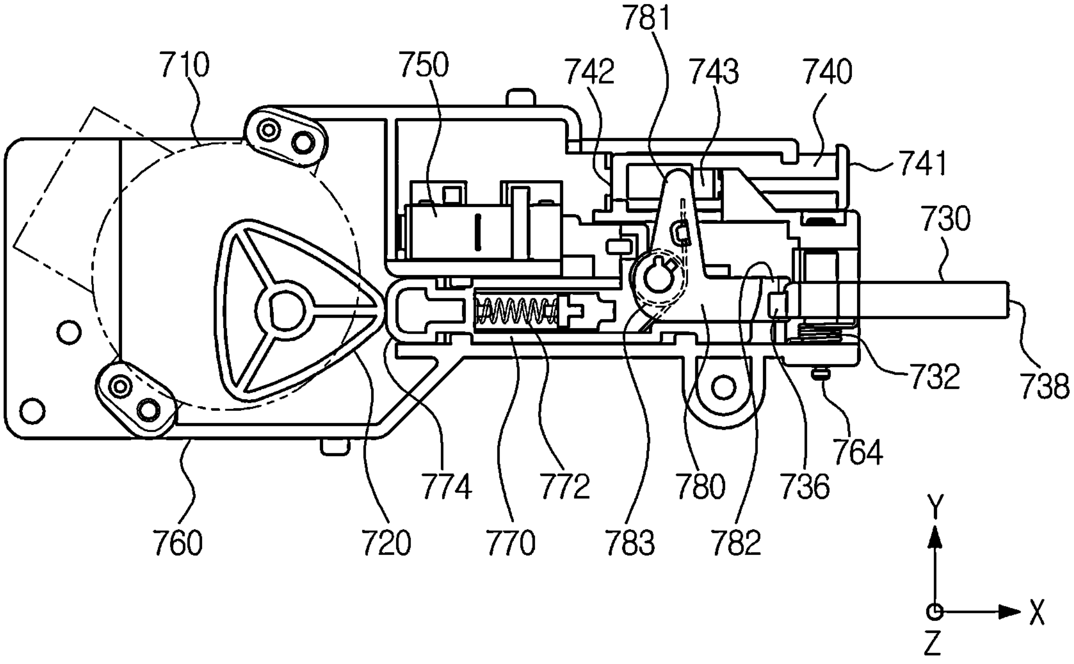

FIG. 9 is a perspective view of a door locking device according to a fourth embodiment of the present disclosure.

Referring to FIG. 9, a door locking device 101 may include a housing 760, a motor 710, a cam 720, a follower 770, a follower elastic body 772, a switch 750, a lock releasing cam 780, a lock releasing guide 740, a locker 730, and a locker elastic body 732. However, the present disclosure is not limited thereto, and the door locking device 101 may further include additional components or remove some components in order to implement the effects of the present disclosure.

The housing 760 may provide a space in which the above-described components included in the door locking device 101 are located. Referring to FIG. 9, the cam 720 may be rotatably disposed at a central portion of the housing 760. The follower 770 may be positioned in the X axis direction based on the cam 720, and the locker 730 may be positioned in the X axis direction based on the follower 770. The lock releasing cam 780 may be disposed to overlap with a portion of the follower 770. The lock releasing guide 740 may be disposed in the Y axis direction of the follower 770.

According to an embodiment, parts of the locker 730 and the lock releasing guide 740 may be located outside the housing 760 through an opening formed on a sidewall 762 of the housing 760.

According to an embodiment, driving of the motor 710 may be controlled by the switch 750. A shaft (not shown) included in the motor 710 and the cam 720 may be physically connected to each other. For example, the shaft coupled to the cam 720 may be rotated by the driving of the motor 710, and thereby the cam 720 may be rotated. However, the present invention is not limited thereto, and a connection structure such as a gear may be disposed between the motor 710 and the cam 720.

According to an embodiment, the cam 720 may rotate in the first rotation direction or the second rotation direction opposite to the first rotation direction by the driving of the motor 710.

According to various embodiments, the cam 720 may have various shapes. FIG. 9 illustrates that the cam 720 is formed in a triangular shape, but the present disclosure is not limited thereto.

According to an embodiment, the follower 770 may linearly move within the housing 760 in response to the rotation of the cam 720. The follower 770 may include the follower elastic body 772 having one end fastened to the housing 760 and the other end fastened to the follower 770 to provide an elastic force in a direction in which the cam 720 is positioned. In a state in which the elastic force is received by the follower elastic body 772 in the direction in which the cam 720 is positioned, the follower 770 may linearly move in a direction in which the locker 730 is positioned in response to the rotation of the cam 720.

According to an embodiment, the lock releasing cam 780 may overlap the follower 770 in the Z axis direction and may be rotatably disposed on a shaft 774 provided on the follower 770. The lock releasing cam 780 may include a first end 781 and a second end 782 and may have a hole 785 to which the shaft 774 may be coupled.

According to an embodiment, the locker 730 may include a hole 731 to which a shaft 764 may be rotatably fitted, one end 736 coming into contact with the first end 781 of the lock releasing cam 780, and the other end 738 that is inserted into a locker holder (e.g., the locker holder 210 of FIG. 3). The one end 736 and the hole 731 of the locker 730 may be located inside the housing 760, and at least a portion of the other end 738 of the locker 730 may be located outside the housing 760.

The locker 730 may be rotatably fitted into the shaft 764 provided at a part of the housing 760 using the hole 731 and may rotate in the first rotation direction or the second rotation direction opposite to the first rotation direction in response to the rotation of the lock releasing cam 780. In response to the rotation of the lock releasing cam 780, the one end 736 of the locker 730 may come into contact with the second end 782 of the lock releasing 720. The one end of the locker 730 may include, for example, an inclined surface. In response to the rotation of the lock releasing cam 720, the other end 738 of the locker 730 may be coupled to the locker holder 210 or separated from the locker holder 210. The other end 738 of the locker 730 may have a shape.

According to various embodiments, the locker elastic body 732 may be further fitted into the shaft 764 on which the locker 730 is fitted. The locker elastic body 732 may provide an elastic force in the first or second rotation direction with respect to the locker 730. The locker elastic body 732 may also provide an elastic force for pushing the locker 730 in one direction along the direction of the shaft 764 with respect to the locker 730.

According to an embodiment, the lock releasing guide 740 may include one end 741 located outside the housing 760, the other end 742 located inside the housing 760, and a support part 743 located between the one end 741 and the other end 742 and coming into contact with the first end 781 of the lock releasing cam 780.

According to various embodiments, the lock releasing guide 740 may be disposed on the housing 760 to be linearly movable. For example, in response to the rotation of the lock releasing cam 780, the support part 743 may come into contact with the first end 781 of the lock releasing cam 780, and the lock releasing guide 740 may move linearly in the first linear direction. The first linear direction may be, for example, a direction in which the one end 741 of the lock releasing guide 740 moves away from the housing 760. Or, the first linear direction may be the X axis direction.

According to various embodiments, when the one end 741 of the lock releasing guide 740 moves linearly by an external force, the lock releasing cam 780 may rotate in the second rotation direction opposite to the first rotation direction. For example, when a user applies a force in a direction opposite to the first linear direction with respect to the one end 741 of the lock releasing guide 740, the support part 743 may transmit the external force to the first end 781 of the lock releasing cam 780, and thereby the lock releasing cam 780 may rotate in the second rotation direction.

FIG. 10 illustrates operations of the door locking device according to the fourth embodiment of the present disclosure.

Figure 10A:
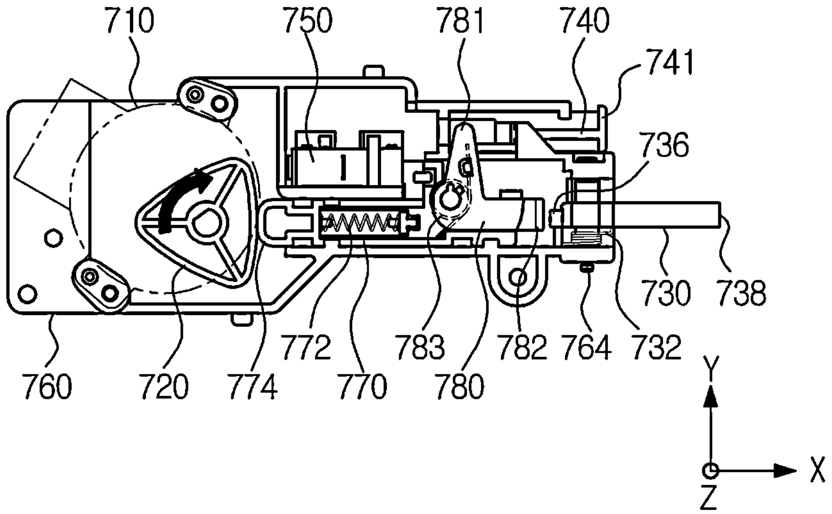
FIG. 10 illustrates operations of the door locking device according to the fourth embodiment of the present disclosure.

FIG. 10A may be in a door-lock releasing state.

Referring to FIG. 10A, the one end 774 of the follower 770 may be in a state of coming into contact with a surface close to the center of the cam 720. The follower 770 may be in a state of receiving an elastic force in a direction in which the cam 720 is located (the −X axis direction) by the follower elastic body 772. The second end 782 of the lock releasing cam 780 and the one end 736 of the locker 730 may be in a state of not coming into contact with each other yet. The locker 730 may be receiving an elastic force in the fourth rotation direction by the locker elastic body 732. The fourth rotation direction may be, for example, the counter-clockwise direction. Or, the second rotation direction may be the rotation direction from the X axis to the Z axis.

According to various embodiments, the lock releasing cam 780 may further include a lock releasing elastic body 783. In this case, the lock releasing elastic body 783 may provide an elastic force in the second rotational direction to guide the lock releasing cam 780 to come into contact with the one end 736 of the locker 730 without shaking.

According to an embodiment, most of the lock releasing guide 740 may be located inside the housing 760. Therefore, in this case, even when the user applies an external force to the one end 741 of the lock releasing guide 740, the lock releasing guide 740 does not move.

Figure 10B:
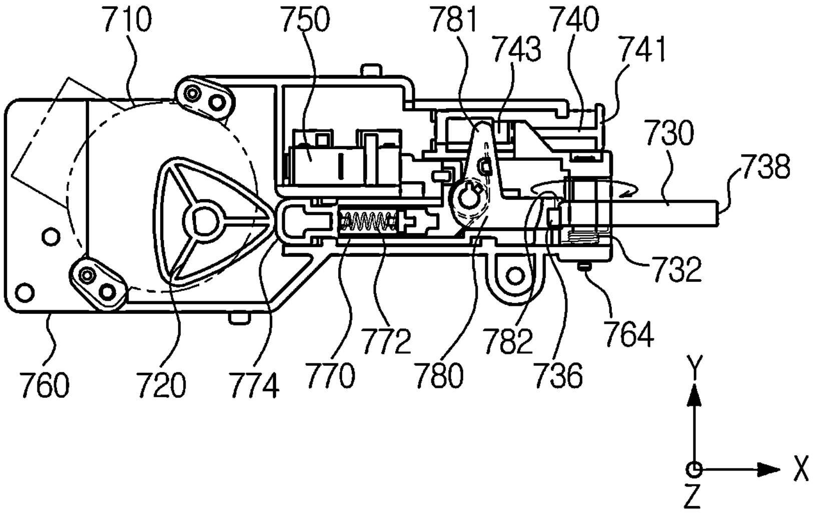

FIG. 10B may be in a door locking state.

Referring to FIGS. 10A and 10B, the cam 720 may rotate in the first rotation direction by the driving of the motor 710. The first rotation direction may be, for example, the clockwise direction. Or, the first rotation direction may be the rotation direction from the Y axis to the X axis. As the cam 720 rotates in the first rotation direction, the follower 770 may linearly move in the first linear direction. The first linear direction may be, for example, a direction in which the locker 730 is positioned. Or, the first linear direction may be the X axis direction.

As the follower 770 moves, the second end 782 of the lock releasing cam 780 rotatably fastened to the follower 770 may come into contact with a lower end of the one end 736 of the locker 730. As a contact area between the second end 782 of the lock releasing cam 780 and the one end 736 of the locker 730 increases, the locker 730 may rotate in the third rotation direction about the shaft 764. The third rotation direction may be, for example, the clockwise direction. Or, the third rotation direction may be the rotation direction from the Z axis to the X axis. As the locker 730 rotates in the third rotation direction, the other end 738 of the locker 730 may be coupled to a locker holder (e.g., the locker holder 210 of FIG. 3).

According to various embodiments, the locker 730 may be in a state of receiving an elastic force in the fourth rotation direction by the locker elastic body 732. The fourth rotation direction may be, for example, the counterclockwise direction. Or, the fourth rotation direction may be the rotation direction from the X axis to the Z axis. That is, the locker 730 may overcome the elastic force by using the force transmitted to the locker 730 by the movement of the lock releasing cam 780 and rotate in the third rotation direction.

As described above with reference to FIG. 3, as the door locking device 740 is provided in the main body 10 of the oven 1 and the locker holder 210 is provided in the door 30, when the locker 730 is coupled to the locker holder 210, the oven 1 becomes in the door locking state, and thereby is in a state of being not open even by an external force of a user who attempts to open the door 30.

According to various embodiments, inclined surfaces may be provided at the second end 782 of the lock releasing cam 780 and the one end 736 of the locker 730, respectively. With this configuration, kinetic energy may be transferred with a minimized resistance force to the second end 782 and the one end 736 of the locker 730.

As the follower 770 moves, the first end 781 of the lock releasing cam 780 may transfer kinetic energy to the support part 743 while coming into contacting with the support part 743 of the lock releasing guide 740. The lock releasing guide 740 may move in the first linear direction by the kinetic energy transferred through the support part 743. The first linear direction may be, for example, a direction in which the one end 741 of the lock releasing guide 740 moves away from the housing 760. Or, the first linear direction may be the X axis direction.

According to various embodiments, as described above, the oven 1 may automatically drive the door locking device 101 in a specific mode to enter the door locking state in which the door 30 is not open. However, when the power to the oven 1 is cut off in the door locking state, the door 30 needs to be forcibly open. The door locking device 101 according to an embodiment of the present disclosure may release the door locking state as needed using the lock releasing guide 740.

Figure 10C:
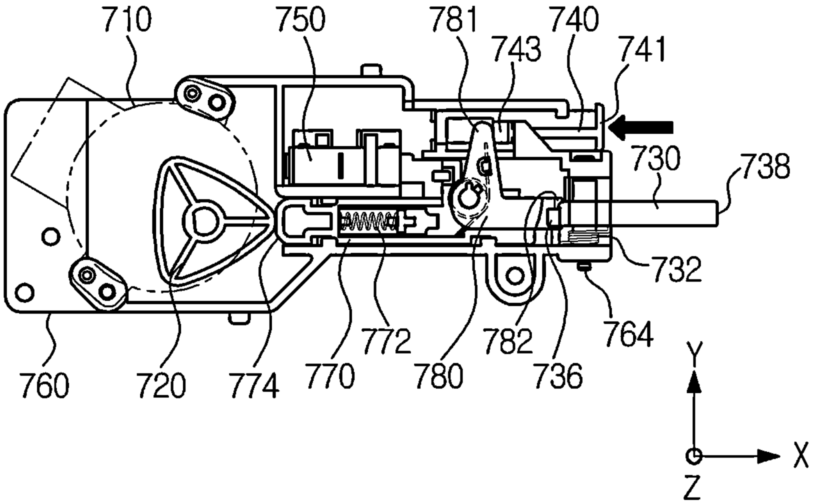
Figure 10D:
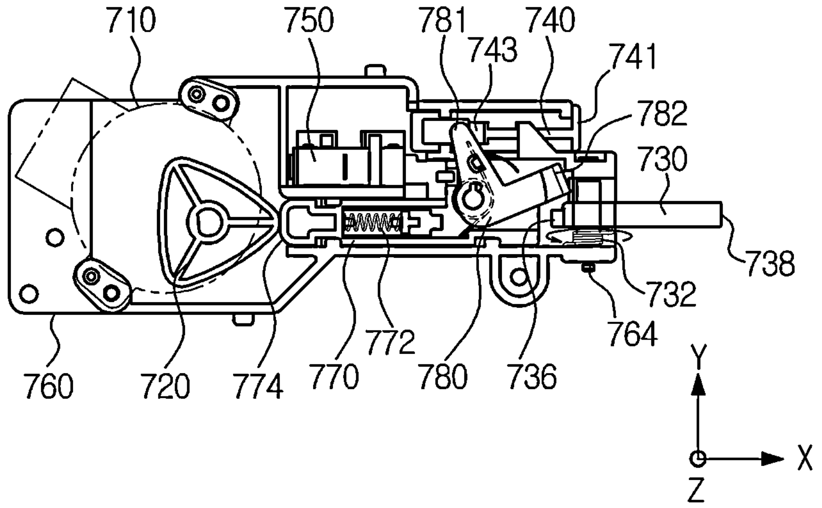

Referring to FIGS. 10C and 10D, the lock releasing guide 740 may move in the second linear direction. For example, a user may move the lock releasing guide 740 in the second linear direction. The second linear direction may be, for example, a direction in which the one end 741 of the lock releasing guide 740 approaches the housing 760. Or, the second linear direction may be the −X axis direction.

Referring to FIGS. 10C and 10D, in response to the movement of the lock releasing guide 740 in the second linear direction, the lock releasing cam 780 may rotate in the second rotation direction. For example, the support part 743 of the lock releasing guide 740 may transfer kinetic energy to the first end 781 of the lock releasing cam 780, and thereby the lock releasing cam 780 may rotate in the second rotation direction. The second rotation direction may be, for example, the counterclockwise direction. Or, the second rotation direction may be the rotation direction from the X axis to the Y axis.

According to an embodiment, as the lock releasing cam 780 rotates in the second rotation direction, a contact area between the one end 736 of the locker 730 and the second end 782 of the lock releasing cam 780 may gradually decrease. Accordingly, the locker 730 may gradually rotate in the fourth rotation direction. The fourth rotation direction may be, for example, the counterclockwise direction. Or, the fourth rotation direction may be the rotation direction from the X axis to the Z axis.

According to various embodiments, as the contact area between the second end 782 of the lock releasing cam 780 and the one end 736 of the locker 730 decreases, the locker 730 may rotate in the fourth rotation direction by the locker elastic body 732 that is providing the elastic force in the fourth rotation direction. The other end 738 of the locker 730 may be separated from the locker holder 210. Accordingly, the door locking device 101 may be changed to the door-lock releasing state.

Figure 11A:
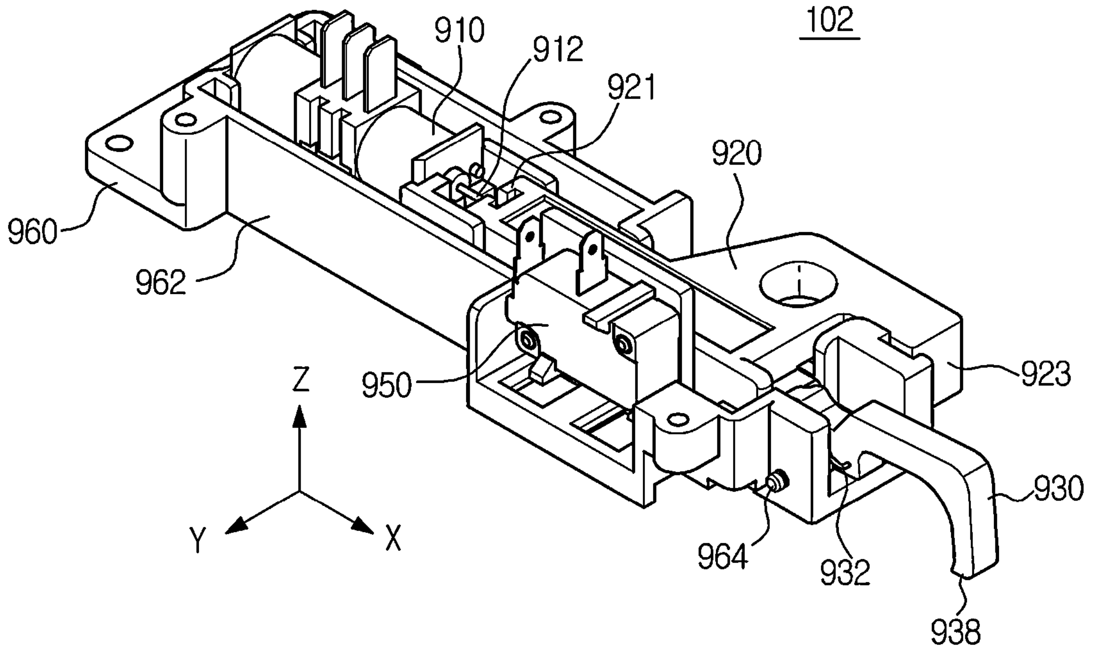
FIG. 11 is a perspective view of a door locking device according to a fifth embodiment of the present disclosure.
Figure 11B:
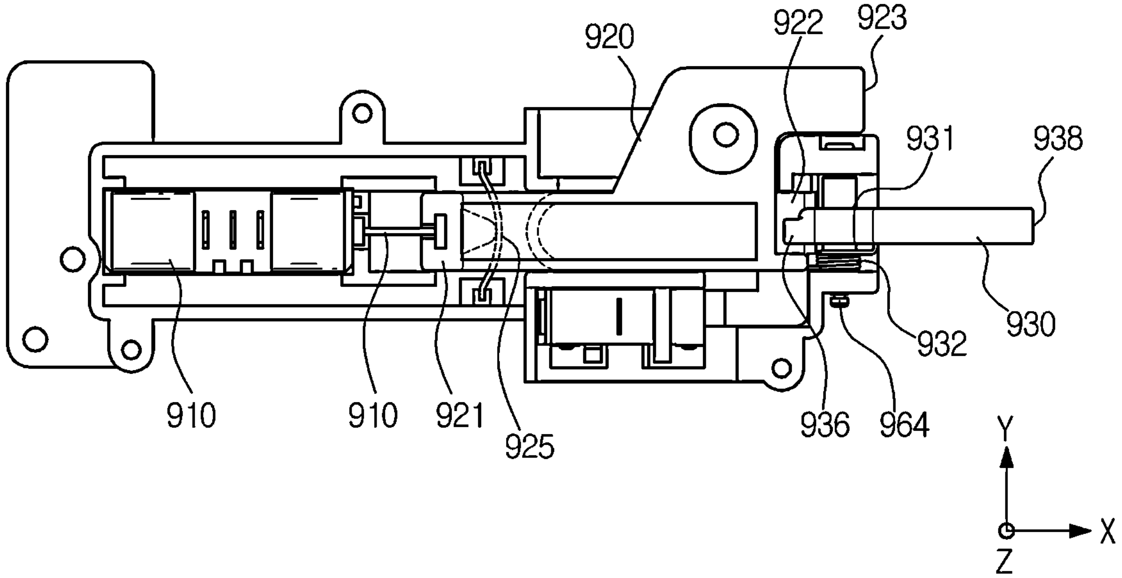

FIG. 11 is a perspective view of a door locking device according to a fifth embodiment of the present disclosure.

Referring to FIG. 11, a door locking device 102 may include a housing 960, a solenoid 910, a lock releasing guide 920, a position control elastic body 925, a switch 950, a locker 930, and a locker elastic body 932. However, the present disclosure is not limited thereto, and the door locking device 102 may further include additional components or remove some components in order to implement the effects of the present disclosure.

The housing 960 may provide a space in which the above-described components included in the door locking device 102 are located. Referring to FIG. 11, the solenoid 90 and the lock releasing guide 920 may be disposed inside the housing 960. The lock releasing guide 920 may include a first end 921, a second end 922, and a third end 923. The first end 921 of the lock releasing guide 920 may be in a state of being fastened to a plunger 912 of the solenoid 910. The locker 930 may be located in the X axis direction based on the lock releasing guide 920. When the door locking device 102 is operated, the second end 922 of the lock releasing guide 920 may come into contact with one end 936 of the locker 930. The third end 923 of the lock releasing guide 920 may be located outside the housing 960 through an opening formed on a sidewall 962 of the housing 960.

According to an embodiment, driving of the solenoid 910 may be controlled by the switch 950. The plunger 912 included in the solenoid 910 may be fastened to the first end 921 of the lock releasing guide 920. The plunger 912 may linearly move according to the driving of the solenoid 910.

According to an embodiment, the lock releasing guide 920 may be disposed on the housing 960 to enable a linear motion in response to the movement of the plunger 912.

According to an embodiment, the position control elastic body 925 may provide an elastic force such that the lock releasing guide 920 is disposed without movement at a certain position after completing the movement.

According to an embodiment, the locker 930 may be rotatably fitted into the shaft 964 provided at a part of the housing 960 using the hole 931 and may rotate in the first third rotation direction or the second rotation direction opposite to the first rotation direction in response to the movement of the lock releasing guide 920. In response to the movement of the lock releasing guide 920, the one end 936 of the locker 930 may come into contact with the second end 922 of the lock releasing guide 920. The second end 922 of the lock releasing guide 920 and the one end 936 of the locker 930 may include, for example, an inclined surface. In response to the movement of the lock releasing guide 920, the other end 938 of the locker 930 may be coupled to a locker holder (e.g., the locker holder 210) or separated from the locker holder 210. The other end 938 of the locker 930 may have a "]" shape.

According to various embodiments, the locker elastic body 932 may be further fitted into the shaft 964 on which the locker 930 is fitted. The locker elastic body 932 may provide an elastic force in the first or second rotation direction with respect to the locker 930. The locker elastic body 932 may also provide an elastic force for pushing the locker 930 in one direction along the direction of the shaft 964 with respect to the locker 930.

FIG. 12 illustrates operations of the door locking device according to the fifth embodiment of the present disclosure.

Figure 12A:
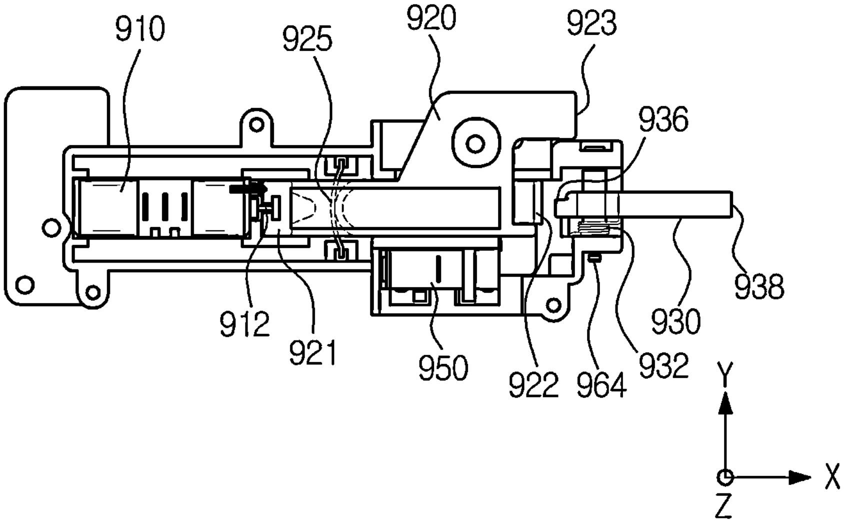
FIG. 12 illustrates operations of the door locking device according to the fifth embodiment of the present disclosure.

FIG. 12A may be in a door-lock releasing state.

Referring to FIG. 12A, the lock releasing guide 920 may be in a state closest to the solenoid 910. The position control elastic body 925 may provide an elastic force such that the lock releasing guide 920 does not move at the current position. The second end 922 of the lock releasing guide 920 and the one end 936 of the locker 930 may be in a state of not coming into contact with each other yet. The locker 930 may receive an elastic force in the fourth rotation direction by the locker elastic body 932. The fourth rotation direction may be, for example, the counterclockwise direction. Or, the fourth rotation direction may be the rotation direction from the X axis to the Z axis.

Figure 12B:
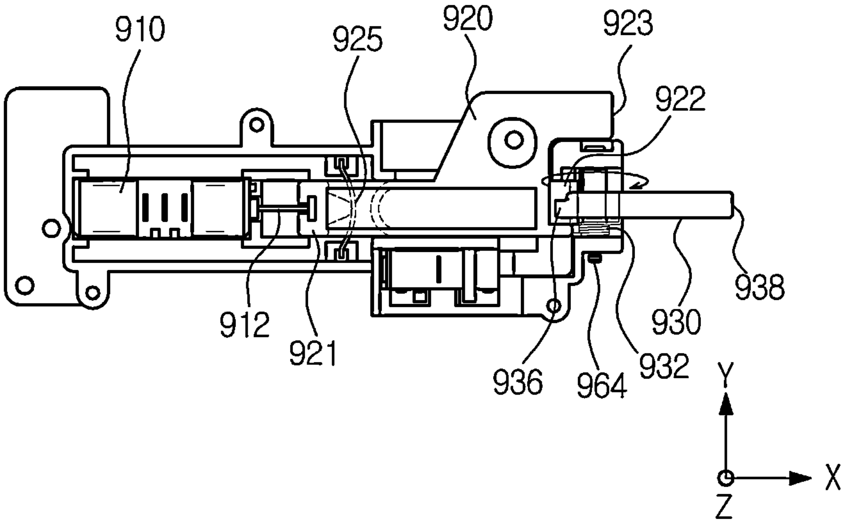

FIG. 12B may be in a door locking state.

Referring to FIGS. 12A and 12B, the lock releasing guide 920 may move in the first linear direction by driving of the solenoid 910. The first linear direction may be, for example, a direction in which the lock releasing guide 920 approaches the locker 930. Or, the first linear direction may be the X axis direction.

As the lock releasing guide 920 moves, the second end 922 of the lock releasing guide 920 may come into contact with a lower end of the one end 936 of the locker 930. As a contact area between the second end 922 of the lock releasing guide 920 and the one end 936 of the locker 930 increases, the locker 930 may rotate in the third rotation direction about the shaft 964. The third rotation direction may be, for example, the clockwise direction. Or, the third rotation direction may be the rotation direction from the Z axis to the X axis. As the locker 930 rotates in the third rotation direction, the other end 938 of the locker 930 may be coupled to the locker holder 210.

According to various embodiments, the locker 930 may be in a state of receiving an elastic force in the fourth rotation direction by the locker elastic body 932. The fourth rotation direction may be, for example, the counterclockwise direction. Or, the fourth rotation direction may be the rotation direction from the X axis to the Z axis. That is, the locker 930 may overcome the elastic force by using the force transmitted to the locker 930 by the movement of the lock releasing guide 920 and rotate in the third rotation direction.

As described above with reference to FIG. 3, as the door locking device 102 is provided in the main body 10 of the oven 1 and the locker holder 930 is provided in the door 30, when the locker 930 is coupled to the locker holder 210, the oven 1 becomes in the door locking state, and thereby is in a state of being not open even by an external force of a user who attempts to open the door 30.

According to various embodiments, inclined surfaces may be provided at the second end 922 of the lock releasing guide 920 and the one end 936 of the locker 930, respectively. With this configuration, kinetic energy may be transferred with a minimized resistance force to the second end 922 and the one end 936 of the locker 930.

According to various embodiments, as described above, the oven 1 may automatically drive the door locking device 102 in a specific mode to enter the door locking state in which the door 30 is not open. However, when the power to the oven 1 is cut off in the door locking state, the door 30 needs to be forcibly open. The door locking device 102 according to an embodiment of the present disclosure may release the door locking state as needed using the lock releasing guide 920.

Figure 12C:
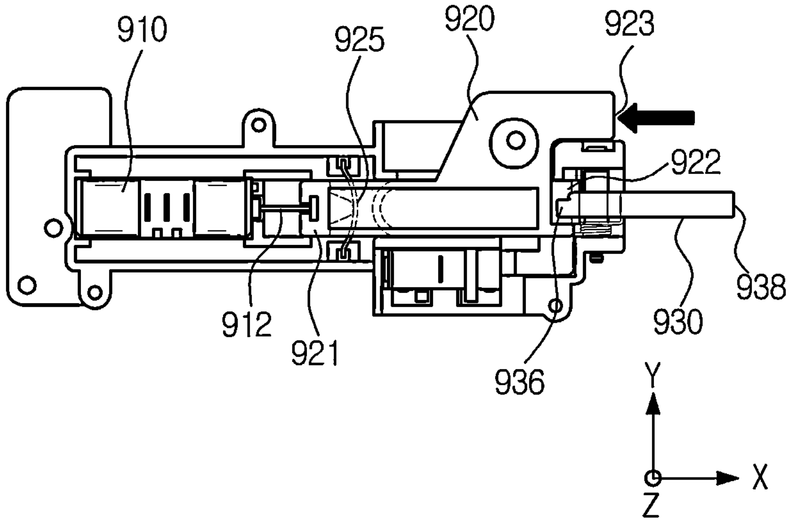
Figure 12D:
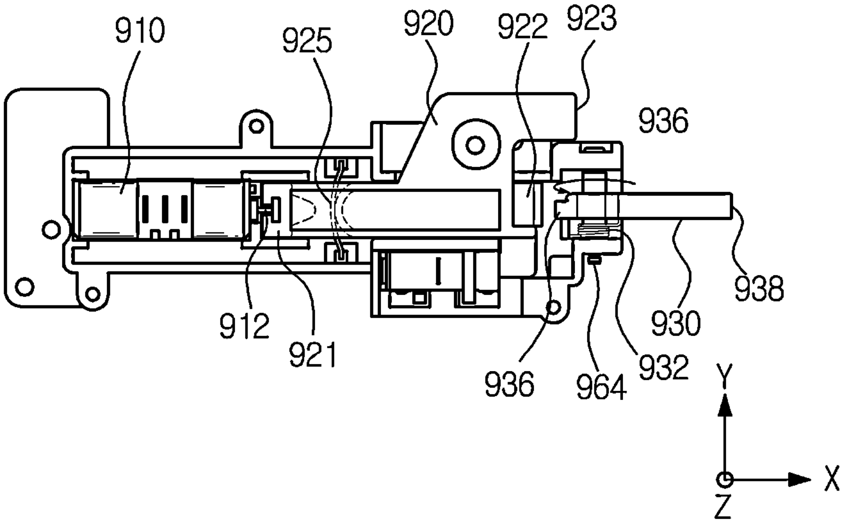

Referring to FIGS. 12C and 12D, the lock releasing guide 920 may move in the second linear direction. For example, the user may move the lock releasing guide 920 in the second linear direction. The second linear direction may be, for example, a direction in which the third end 923 of the lock releasing guide 920 approaches the housing 960. Or, the second linear direction may be the −X axis direction.

Referring to FIGS. 12C and 12D, as the lock releasing guide 920 moves in the second linear direction, a contact area between the one end 936 of the locker 930 and the second end 922 of the lock releasing guide 920 may gradually decrease. Accordingly, the locker 930 may rotate in the fourth rotation direction. The fourth rotation direction may be, for example, the counterclockwise direction. Or, the fourth rotation direction may be the rotation direction from the X axis to the Z axis.

According to various embodiments, as the contact area between the second end 922 of the lock releasing guide 920 and the one end 936 of the locker 930 decreases, the locker 930 may rotate in the fourth rotation direction by the locker elastic body 932 that is providing the elastic force in the fourth rotation direction. The other end 938 of the locker 930 may be separated from the locker holder 210. Accordingly, the door locking device 102 may be changed to the door-lock releasing state.

According to an embodiment, the position control elastic body 925 may provide an elastic force such that the lock releasing guide 920 does not move at the current position.

FIG. 13 illustrates operations of releasing a door lock state in a door locking device according to a sixth embodiment of the present disclosure.

Referring to FIG. 13, a door locking device 103 may include a cam 1120, a follower 1140, a lock releasing guide 1150, a lock releasing elastic body 1152, and a locker 1130. However, the present disclosure is not limited thereto, and the door locking device may further include additional components or remove some components in order to implement the effects of the present disclosure.

Figure 13A:
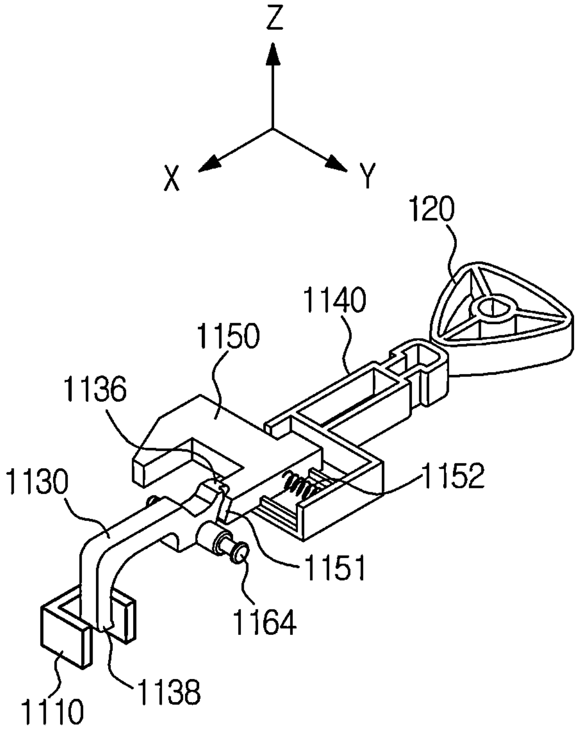
FIG. 13 illustrates operations of releasing a door lock state in a door locking device according to a sixth embodiment of the present disclosure.

Referring to FIG. 13A, the door locking device 103 may be in a door locking state. For example, the follower 1140 may move in the first linear direction to move the lock releasing guide 1150. As the lock releasing guide 1150 moves in the first linear direction, a first end 1151 of the lock releasing guide 1150 may transfer kinetic energy to a lower end of one end 1136 of the locker 1130, and the locker 1130 may rotate about a shaft 1164 so that the other end 1138 may be in a state of being coupled to a locker holder 1110.

Figure 13B:
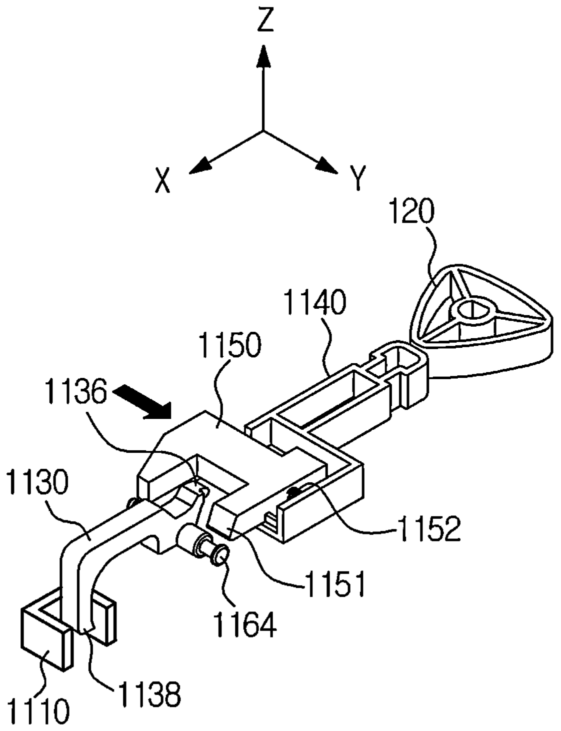

Referring to FIG. 13B, the lock releasing guide 1150 may move in a direction perpendicular to a moving direction of the follower 1140. For example, a user may move the lock releasing guide 1150 in a direction perpendicular to the first linear direction.

According to an embodiment, as the lock releasing guide 1150 moves, a contact area between the first end 1151 of the lock releasing guide 1150 and the one end 1136 of the locker 1130 may decrease.

Figure 13C:
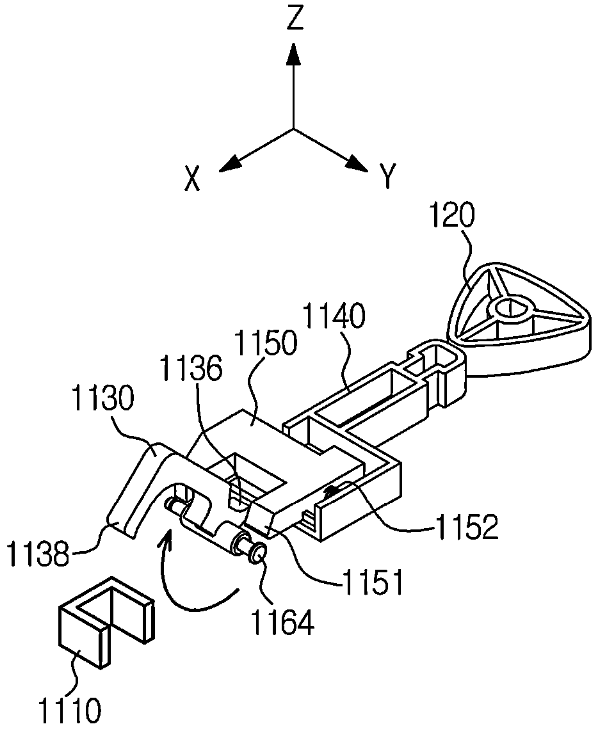

Referring to FIG. 13C, as the contact between the first end 1151 of the lock releasing guide 1150 and the one end 1136 of the locker 1130 is released, the locker 1130 may be rotated to be separated from the locker holder 1110. Accordingly, the door locking device 103 may be changed to the door lock releasing state.

The foregoing has illustrated and described specific embodiments. However, it should be understood by those of skilled in the art that the disclosure is not limited to the above-described embodiments, and various changes and modifications may be made without departing from the technical idea of the disclosure described in the following claims.

The invention claimed is:

1. An oven comprising:
- a main body comprising a cooking chamber;
- a door rotatably coupled to the main body to open or close the cooking chamber, the door comprising a locker holder; and
- a door locking device configured to lock the door not to be open with respect to the main body,
- the door locking device comprising:
  - a cam configured to be rotatable, the cam comprising:
    - a plurality of first contact parts; and
    - a plurality of second contact parts;
  - a lock releasing guide configured to be linearly movable to selectively come into contact with the plurality of first contact parts; and
  - a locker couplable to the locker holder of the door to lock the door, and configured to come into contact with the plurality of second contact parts to be coupled to a locker holder of the door, wherein while the lock releasing guide is not coming into contact with the plurality of first contact parts, the cam is rotated so that the plurality of second contact parts contact with the locker to rotate the locker to be coupled to the locker holder to the door.

2. The oven according to claim 1, wherein in response to the lock releasing guide linearly moving to come into contact with the plurality of first contact parts, a contact between the locker and the plurality of second contact parts is released so that the locker is separated from the locker holder.

3. The oven according to claim 2, wherein the door locking device further comprise a shaft, and wherein the locker comprises:

one end coming into contact with the plurality of second contact parts;

an other end coupled to the locker holder; and a hole disposed between the one end of the locker and the other end of the locker, and to have the shaft to be rotatably fitted into the hole.

4. The oven according to claim 3, wherein in response to releasing a contact between the lock releasing guide and the plurality of first contact parts and the one end of the locker coming into contact with the plurality of second contact parts, the locker rotates about the shaft so that the other end of the locker is coupled to the locker holder.

5. The oven according to claim 4, wherein the door locking device comprises a locker elastic body fitted into the shaft, and wherein in response to releasing the contact between the lock releasing guide and the plurality of first contact parts and the one end of the locker being separated from the plurality of second contact parts, the locker is rotated by an elastic force of the locker elastic body so that the other end of the locker is separated from the locker holder.

6. The oven according to claim 3, wherein in response to rotating the locker about the shaft, the other end of the locker is separated from the locker holder.

7. The oven according to claim 3, wherein the one end of the locker has a surface corresponding to a shape of the plurality of second contact parts so that while the one end of the locker is coming into contact with the surface of the plurality of second contact parts, a resistance force occurred in the contacted surface is reduced.

* * * * *